(12) United States Patent
Pereira et al.

(10) Patent No.: US 11,132,997 B1
(45) Date of Patent: Sep. 28, 2021

(54) ROBUST AUDIO IDENTIFICATION WITH INTERFERENCE CANCELLATION

(71) Applicant: Roku, Inc., San Jose, CA (US)

(72) Inventors: Jose Pio Pereira, Cupertino, CA (US); Sunil Suresh Kulkarni, San Jose, CA (US); Mihailo M. Stojancic, San Jose, CA (US); Shashank Merchant, Sunnyvale, CA (US); Peter Wendt, San Jose, CA (US)

(73) Assignee: Roku, Inc., San Jose, CA (US)

( * ) Notice: Subject to any disclaimer, the term of this patent is extended or adjusted under 35 U.S.C. 154(b) by 124 days.

(21) Appl. No.: 16/140,538

(22) Filed: Sep. 25, 2018

Related U.S. Application Data

(63) Continuation of application No. 15/456,859, filed on Mar. 13, 2017, now Pat. No. 10,360,905.
(Continued)

(51) Int. Cl.
*G10L 15/20* (2006.01)
*G10L 25/81* (2013.01)
(Continued)

(52) U.S. Cl.
CPC ........... *G10L 15/20* (2013.01); *G10L 15/02* (2013.01); *G10L 15/063* (2013.01); *G10L 15/10* (2013.01);
(Continued)

(58) Field of Classification Search
CPC ................................ G10L 15/20; G10L 21/02
See application file for complete search history.

(56) References Cited

U.S. PATENT DOCUMENTS 7,676,046 B1 * 3/2010 Nelson ................ H04B 1/1027
381/94.3
7,792,281 B1 9/2010 Zad-Issa et al.
(Continued)

OTHER PUBLICATIONS

ETSI ES 201 108 V1.1.3, "Speech Processing, Transmission and Quality Aspects (STQ); Distributed speech recognition; Front-end feature extraction algorithm; Compression algorithms", Sep. 2003, pp. 1-22, Publisher: European Telecommunications Standards Institute.
(Continued)

*Primary Examiner* — Jakieda R Jackson
(74) *Attorney, Agent, or Firm* — McDonnell Boehnen Hulbert & Berghoff LLP

(57) ABSTRACT

Audio distortion compensation methods to improve accuracy and efficiency of audio content identification are described. The method is also applicable to speech recognition. Methods to detect the interference from speakers and sources, and distortion to audio from environment and devices are discussed. Additional methods to detect distortion to the content after performing search and correlation are illustrated. The causes of actual distortion at each client are measured and registered and learnt to generate rules for determining likely distortion and interference sources. The learnt rules are applied at the client, and likely distortions that are detected are compensated or heavily distorted sections are ignored at audio level or signature and feature level based on compute resources available. Further methods to subtract the likely distortions in the query at both audio level and after processing at signature and feature level are described.

20 Claims, 18 Drawing Sheets

Related U.S. Application Data

(60) Provisional application No. 62/306,719, filed on Mar. 11, 2016, provisional application No. 62/306,707, filed on Mar. 11, 2016, provisional application No. 62/306,700, filed on Mar. 11, 2016.

(51) Int. Cl.

| | | |
|---|---|---|
| *G10L 21/0232* | (2013.01) | |
| *G10L 15/06* | (2013.01) | |
| *G10L 15/10* | (2006.01) | |
| *G10L 15/14* | (2006.01) | |
| *G10L 15/02* | (2006.01) | |
| *G10L 21/0216* | (2013.01) | |

(52) U.S. Cl.
CPC ........ *G10L 15/142* (2013.01); *G10L 21/0232* (2013.01); *G10L 25/81* (2013.01); *G10L 2015/025* (2013.01); *G10L 2021/02166* (2013.01)

(56) References Cited

U.S. PATENT DOCUMENTS

| | | | |
|---|---|---|---|
| 7,991,770 B2* | 8/2011 | Covell | G06Q 30/02 707/722 |
| 8,171,030 B2 | 5/2012 | Pereira et al. | |
| 8,195,689 B2 | 6/2012 | Ramanathan et al. | |
| 8,229,227 B2 | 7/2012 | Stojancic et al. | |
| 8,655,656 B2* | 2/2014 | Ketabdar | G10L 25/48 704/240 |
| 8,655,878 B1 | 2/2014 | Kulkarni et al. | |
| 9,020,816 B2 | 4/2015 | McClain | |
| 9,299,364 B1 | 3/2016 | Pereira et al. | |
| 9,313,359 B1 | 4/2016 | Stojancic et al. | |
| 9,367,544 B2 | 6/2016 | Stojancic et al. | |
| 9,390,712 B2* | 7/2016 | Yu | G10L 25/90 |
| 9,510,044 B1 | 11/2016 | Pereira et al. | |
| 9,548,048 B1* | 1/2017 | Solh | G10L 15/063 |
| 9,640,194 B1* | 5/2017 | Nemala | G10L 21/0232 |
| 2002/0116196 A1* | 8/2002 | Tran | G06F 1/3203 704/270 |
| 2002/0191799 A1* | 12/2002 | Nordqvist | H04R 25/505 381/60 |
| 2002/0196876 A1* | 12/2002 | Takada | H04B 1/7101 375/346 |
| 2006/0053002 A1* | 3/2006 | Visser | G10L 21/0272 704/200 |
| 2008/0002606 A1* | 1/2008 | Cheung | H04W 24/00 370/328 |
| 2010/0306193 A1 | 12/2010 | Pereira et al. | |
| 2013/0132077 A1* | 5/2013 | Mysore | G10L 21/028 704/233 |
| 2013/0297299 A1* | 11/2013 | Chakrabartty | G10L 15/02 704/211 |
| 2014/0079248 A1* | 3/2014 | Short | G01S 3/8006 381/119 |
| 2014/0201126 A1 | 7/2014 | Zadeh et al. | |
| 2015/0269427 A1 | 9/2015 | Kim et al. | |
| 2015/0287422 A1* | 10/2015 | Short | G10L 13/02 704/205 |
| 2016/0217792 A1* | 7/2016 | Gorodetski | G10L 17/04 |
| 2017/0125038 A1* | 5/2017 | Hassani | G10L 15/063 |
| 2017/0359807 A1 | 12/2017 | Hong et al. | |

OTHER PUBLICATIONS

Leuzzi, F., et al, "A statistical approach to speaker identification in forensic phonetics field", "Proceedings of 2016 European Conference on Machine Learning and Principles and Practice of Knowledge Discovery in Databases", Sep. 19-23, 2016.

Ma, N., et al., "Exploiting correlogram structure for robust speech recognition with multiple speech sources", "Speech Communication", May 11, 2007, pp. 874-891, vol. 49.

Ma, N., et al., "A speechiness measure to improve speech decoding in the presence of other sound sources", "Proceedings of Interspeech 2008, Brisbane, Australia", Sep. 22-26, 2008, pp. 1285-1288.

Schluter, R., et al., "Gammatone Features and Feature Combination for Large Vocabulary Speech Recognition", "Proceedings of IEEE 2007", Apr. 15-20, 2007.

Zhao, X., et al., "CASA-based Robust Speaker Identification", "IEEE Transactions on Audio, Speech, and Language Processing", Jul. 2012, pp. 1608-1616, vol. 20, No. 5.

\* cited by examiner

| 16b Coeff | 4b Band ID1 | 4b Spectrum Entropy | 4b Feature ID1 | 601 |

Initial Index lookup key

| 16b Coeff | 4b Band ID2 | 4b Spectrum Entropy | 4b Feature ID1 | 602 |

Index lookup key with an alternative combination for fuzzy search, using alternate Band ID2 for Band ID1 based on distortion compensation such as speaker type

| 16b Coeff | 4b Band ID2 | 4b Spectrum entropy | 4b Feature ID2 | 603 |

Index lookup key with an alternative combination for fuzzy search

Fig.6

ROBUST AUDIO IDENTIFICATION WITH INTERFERENCE CANCELLATION

The present application is a continuation of U.S. patent application Ser. No. 15/456,859, filed Mar. 13, 2017 entitled "Robust Audio Identification with Interference Cancellation", which claims the benefit of U.S. Provisional Patent Application No. 62/306,707 filed on Mar. 11, 2016 entitled "Robust Audio Identification with Interference Cancellation"; U.S. Provisional Patent Application No. 62/306,719 filed on Mar. 11, 2016 entitled "Digital Video Fingerprinting Using Motion Segmentation"; and U.S. Provisional Patent Application No. 62/306,700 filed on Mar. 11, 2016 entitled "A Method To Differentiate and Classify Fingerprints Using Fingerprint Neighborhood Analysis"; the disclosures of which are hereby incorporated by reference herein in their respective entireties.

CROSS REFERENCE TO RELATED APPLICATIONS

U.S. Pat. No. 8,229,227 filed Jun. 18, 2008 entitled "Methods and Apparatus for Providing a Scalable Identification of Digital Video Sequences"; U.S. Pat. No. 8,171,030 filed on Jun. 18, 2008 entitled "Methods and Apparatus for Multi-Dimensional Content Search and Video Identification"; U.S. Pat. No. 8,195,689 filed May 3, 2010 entitled "Media Fingerprinting and Identification System"; U.S. Pat. No. 8,655,878 filed May 6, 2011 entitled "A Scalable, Adaptable, and Manageable System for Multimedia Identification"; U.S. Pat. No. 9,510,044 filed Dec. 15, 2011 entitled "TV Content Segmentation, Categorization and Identification and Time-Aligned Applications"; U.S. Pat. No. 9,299,364 filed Oct. 9, 2012 entitled "Audio Content Fingerprinting Based on Two-Dimensional Constant Q-Factor Transform Representation and Robust Audio Identification for Time-Aligned Applications"; U.S. Pat. No. 9,313,359 filed Aug. 21, 2012 entitled "Media Content Identification on Mobile Devices"; and U.S. Pat. No. 9,367,544 filed Mar. 14, 2013 entitled "Method for Efficient Database Formation and Search on Media Devices Acting Synchronously with Television Programming", have the same assignee as the present application, are related applications, and are hereby incorporated by reference in their entireties.

FIELD OF THE INVENTION

The present invention generally relates to speech recognition, audio fingerprinting and identification and tracking, and time-aligned broadcast applications.

BACKGROUND OF THE INVENTION

Audio speech recognition provides a convenient interface for users to communicate with machines. Customer facing businesses use speech recognition to interface with their phone calling customers. Audio content identification is a useful tool to manage and access content and entertainment. Increasingly humans are interacting with machines (also computers or robots) and the audio interface is a favorite. Human interaction with computers and remote machines can benefit from improved speech identification. Applications related to social networking, entertainment and advertising can take advantage of identification of the precise program and the program's exact time as it is played on the consumer device and enable useful solutions for the user, which benefit advertisers and content owners as well.

Robust audio identification in presence of significant ambient and interfering sounds; and tracking of identified content enables the providers to bring various applications directly to smart phones and mobile devices such as tablets. These applications enable widespread use, and take advantage of the network and media convergence.

Interfering sounds from the environment, and interfering speakers reduce accuracy and increase cost to identify content in the captured audio, or to perform speech recognition. For example, with a 0 dB level sound interference, accuracy can reduce by 20% while cost for identification can increase 5 times; compared to a query with 0 dB noise interference only. And with 6 dB speech interference, the accuracy can reduce 30% and cost for identification increases by 10 times; compared to a query with 0 dB noise interference only. Hence it is very desirable to reduce or cancel out the impact of interference.

The effects of distortion and interference are more damaging to speech recognition. Although speech recognition products have made great progress; the accuracy currently deteriorates significantly below 10 dB SNR.

SUMMARY OF THE INVENTION

The present invention recognizes it is desirable to identify the intended source of sound of user content while compensating for interference and distortion by ignoring "interfering sections" or subtracting the estimated interference. One embodiment of the present invention addresses a method for audio identification that is robust in cancelling interfering noise from distorting or interfering audio environment. Audio signals are processed into filter channels to generate a two dimensional (2D) representation of the audio frequency and auto-correlation delay to extract audio features from the 2D representation and to identify a primary audio source and multiple secondary audio sources for appropriate coherent segments. Filter channels are grouped into channel groups each associated with a single pitch in the appropriate coherent segments. The appropriate coherent segments that are related are combined for processing by independent hidden Markov models (HMMs) to model the primary audio source and the multiple secondary audio sources. Interfering sources and attributes are detected and canceled to generate speech fragments for the primary audio source.

Another embodiment of the present invention addresses a method of audio speech recognition that cancels out detected audio components of identified interfering sources. A spectrogram of a received audio signal is generated. In the received audio signal features of a speaker and an interference source are detected. Likely interfering sounds of the detected interference source are subtracted from the spectrogram to form clean audio that is further processed to detect speech phonemes.

A further embodiment of the invention addresses a method of content identification on a smart device that is robust to distortions by ignoring distorted query sections. In a query, a first segment of query signatures in a sliding window is identified that has a high match score with reference signatures of a reference and a second segment of query signatures in the sliding window is identified that has a low match score with the reference signatures, wherein the second segment represents a distorted segment. Query matches are evaluated using the first segment with the high match score and not using the second segment with the low match score. A matching reference and match scores are output.

BRIEF DESCRIPTION OF DRAWINGS

FIG. 6 illustrates field formats used in a fuzzy search process using features with distortion compensated or alternate fields for database access in accordance with an embodiment of the present invention;

DETAILED DESCRIPTION

The present invention will now be described more fully with reference to the accompanying drawings, in which several embodiments of the invention are shown. This invention may, however, be embodied in various forms and should not be construed as being limited to the embodiments set forth herein. Rather, these embodiments are provided so that this disclosure will be thorough and complete, and will fully convey the scope of the invention to those skilled in the art.

It will be appreciated that the present disclosure may be embodied as methods, systems, or computer program products. Accordingly, the inventive concepts disclosed herein may take the form of a hardware embodiment, a software embodiment or an embodiment combining software and hardware aspects. Furthermore, the inventive concepts disclosed herein may take the form of a computer program product on a computer-readable storage medium having computer-usable program code embodied in the medium. Any suitable computer readable medium may be utilized including hard disks, CD-ROMs, optical storage devices, flash memories, or magnetic storage devices.

Computer program code or software programs and associated data that are operated upon or for carrying out operations according to the teachings of the invention may be written in a high level programming language such as C, C++, JAVA®, Smalltalk, JavaScript®, Visual Basic®, TSQL, Perl, use of .NET™ Framework, Visual Studio® or in various other programming languages. Software programs may also be written directly in a native assembler language for a target processor. A native assembler program uses instruction mnemonic representations of machine level binary instructions. Program code or computer readable medium as used herein refers to code whose format is understandable by a processor. Software embodiments of the disclosure do not depend upon their implementation with a particular programming language.

The methods described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. A computer-readable storage medium may be coupled to the processor through local connections such that the processor can read information from, and write information to, the storage medium or through network connections such that the processor can download information from or upload information to the storage medium. In the alternative, the storage medium may be integral to the processor.

Figure 1A:
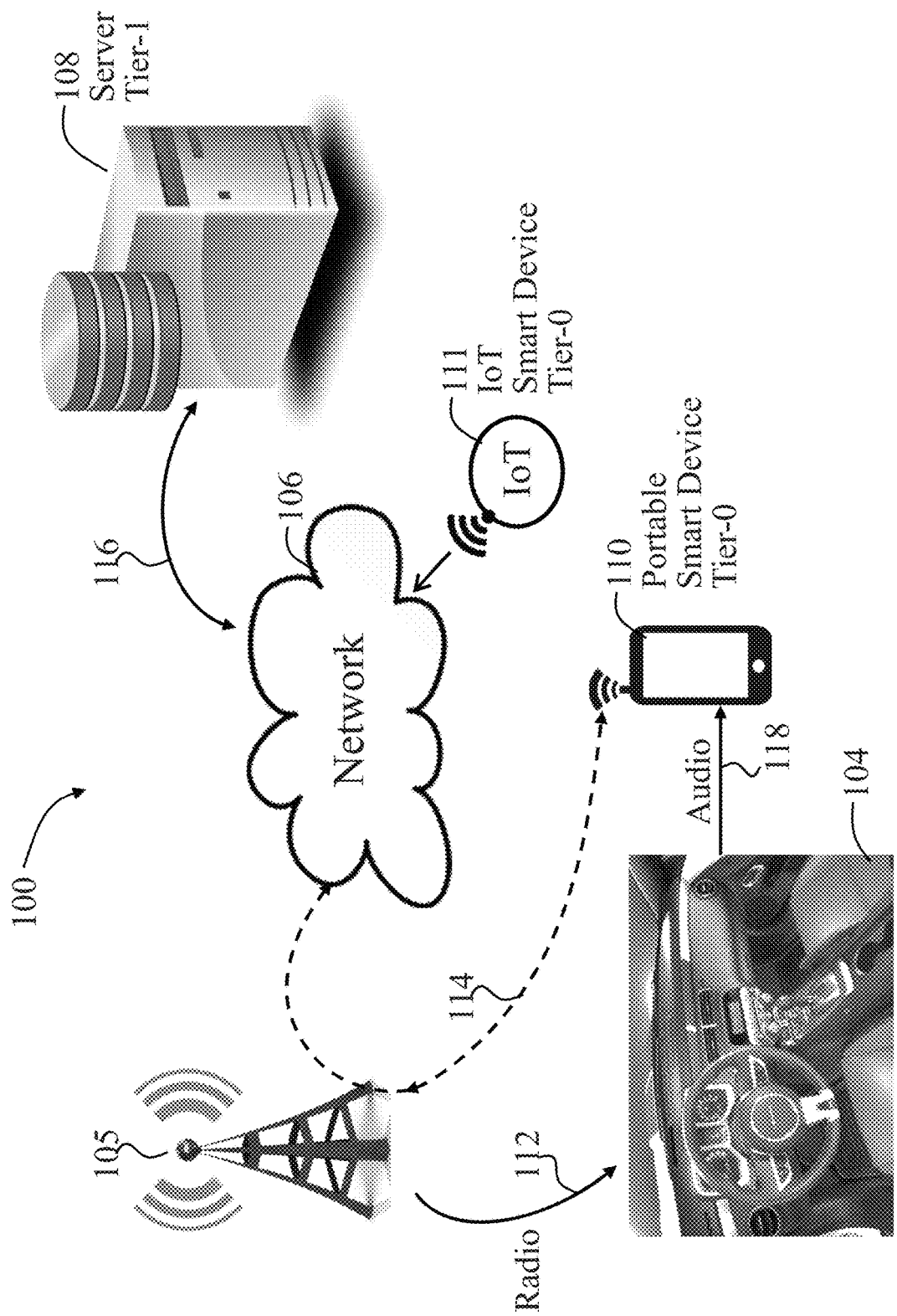
FIG. 1A illustrates a system for providing audio capture, analysis, and fingerprint identification and classification on a portable smart device and Internet of Things (IoT) in accordance with an embodiment of the present invention.

One aspect of the present invention presents a method to identify media content which is restricted to cover audio content, by capturing audio data on a mobile device, appropriately processing the audio content, fingerprinting the audio data, and searching fingerprint databases to identify the audio content. FIG. 1A illustrates a system for providing audio capture, analysis, and fingerprint identification and classification on a portable smart device in accordance with an embodiment of the present invention. The system 100 includes an audio device 104, such as a car radio, a portable radio, television, portable computer, a compact disc (CD) player, a digital video disc (DVD) player, set top box, a gaming machine, or a smartphone device configured to play audio media, a portable smart device 110, such as a smart phone, an Internet of things (IoT) device 111, a network 106, such as the Internet, and a server 108. It is noted that where ever a portable smart device 110 is mentioned, the text also refers to the IoT device 111. The audio device 104, such as a car radio, is generally connected to a remote media broadcast system 105 for receiving audio media content. Also, the audio device 104 may or may not be connected to the Internet 106 or to a satellite network. The system 100 also includes a remote content identification within the portable smart device 110 as a tier-0 system and with the portable smart device 110 connected over the Internet 106 to the server 108 as a tier-1 system. The portable smart device 110 may be a smartphone device, a laptop, a tablet computer, or the like. Connections 112 and 114 are typically wireless connection and connection 116 may be a wired connections, a wireless connections, or a combination of wire cable and wireless connections. Also, the portable smart device 110 may connect wirelessly to the Internet 106 through a wireless router or over 3G or 4G networks while the remote content identification system 108 may be wire or cable attached through a modem to the Internet 106. The portable smart device 110 may be configured to acquire audio signals from the audio device 104 by use of a microphone.

Illustrated system 100 supports applications on the portable smart device 110 that operate in real time and in accordance with media programming content that is being played on the audio device 104 and received by the portable smart device 110. The portable smart device 110 is configured to acquire a temporal fragment of audio content that is playing on the audio device 104 using the audio device's microphone and generates query fingerprints from the temporal fragment of the acquired media content.

A chunk of the query fingerprints is a set of the query fingerprints corresponding to a time segment of the query media signal. Also, a digest of the chunk of the query fingerprints may be formulated as a search query to a local search database on the portable smart device 110 or transmitted to the server 108, also referred to as an external search database or a remote search server 108, for content identification. A digest of the query fingerprints is a summarization of the fingerprints generated for the acquired media content. If the search query is found in a reference database either local or remote, the search process responds with responsive data, such as a title and timing information of the identified media content, along with related metadata, and sends the title, the timing information, and the related metadata to the application that initiated the query on the portable smart device 110. The original chunk of query reference fingerprints or the digest of the query fingerprints found on the remote search server 108 is stored on the portable smart device 110 for further use in local querying a tier-0 mobile media device database located on the portable smart device 110 and in tracking of media content. The method presented automatically switches between remote search on an external search server, and local search on a local reference database on the mobile media device. The local reference database is also described as a signature cache.

The portable smart device 110 may be configured to continuously listen to the media programming content. The programming content may also be tracked by querying locally stored mobile media device reference content. If a change in the media programming content is detected, the portable smart device 110 generates one or more new queries to further search for content identification. This process continues as long as the portable smart device 110 is listening to the media programming content.

The portable smart device 110 may be equipped with an actionable program event detection system, which generates an action signal upon detection of a particular audio fragment stored in the reference fingerprint database. A software application running on the portable smart device 110 can then perform actions based on local search results, presenting to the user a variety of additional information on the same portable smart device 110 in real time while the remote media programming is still playing the associated media content.

The method presented automatically switches between a remote search on the external search database 108, and a local search on a "micro search server" on the portable smart device 110.

Figure 1B:
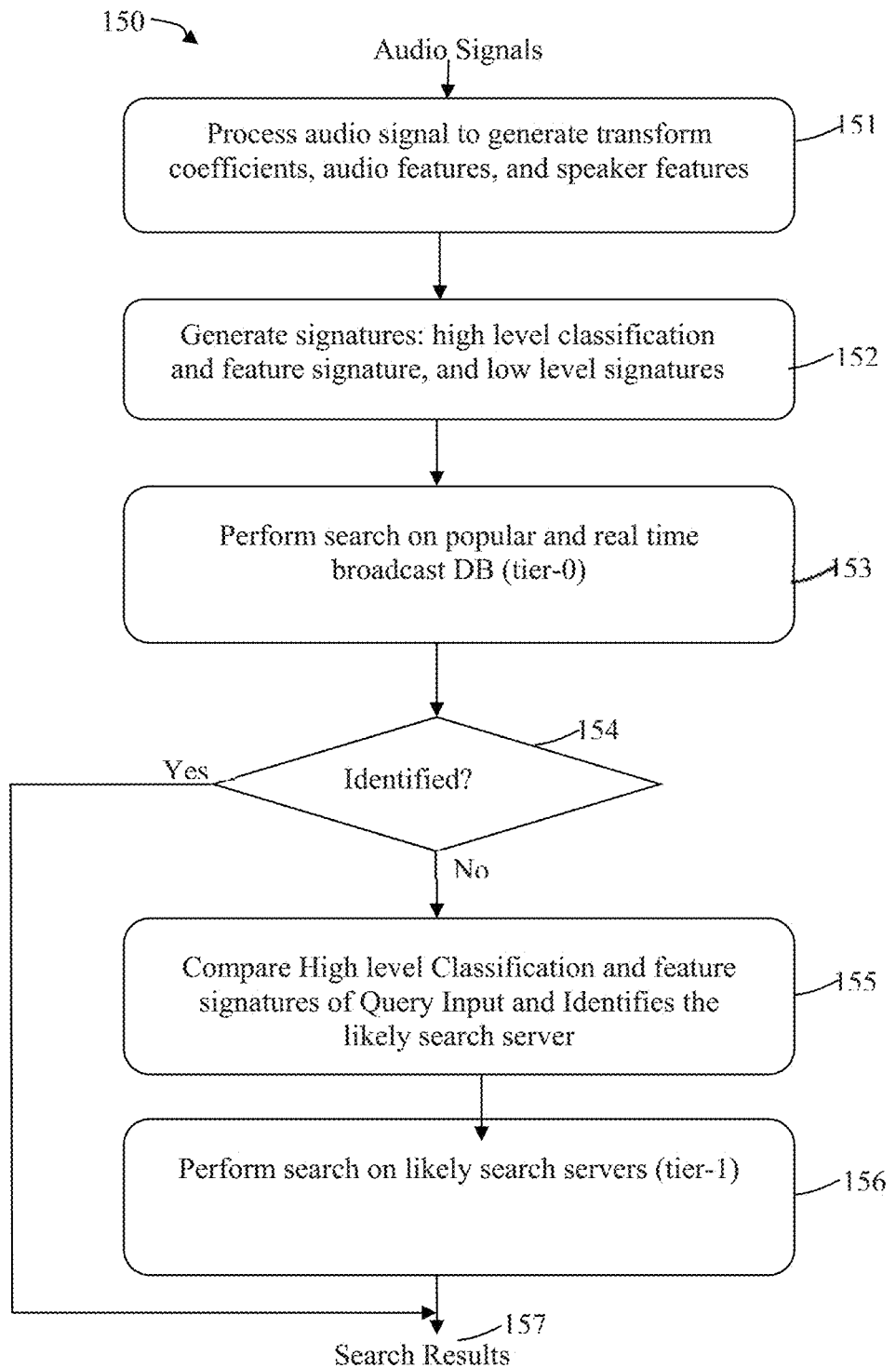
FIG. 1B illustrates a process used by a robust audio identification system to search on two search tiers in accordance with an embodiment of the present invention.

FIG. 1B illustrates a process 150 used by a robust audio identification system to search on two search tiers in accordance with an embodiment of the present invention. In a first step, features are detected from audio content and high level content signatures are generated to be used to increase search performance at the first tier on the portable smart device 110 and, as required, in the next search tier on the server 108. In a second step, the high level content signatures are used to classify the audio content and the generated classifications are used to identify likely servers to search on. Further detailed or low level signatures are used to perform full search and correlation.

At step 151, the incoming audio is processed at the portable smart device 110 also referred to as a client device 110, to generate transform coefficients, detect audio features, identify a speaker and features such as sound types. The computed transforms and features are further processed at step 152 to generate high level classification and or signatures, and low level/detailed signatures. At step 153, a search is performed on the first search tier on the portable smart device 110 for a popular and real time broadcast as these contents are most likely to match incoming queries. The first tier's content on the portable smart device 110 can be geographically different to reflect the likely content and real time broadcast in different geographical regions. At step 154, a decision is made if a match is found in the first tier, and if so a result is produced at 157. If no match is found at step 154, the query is processed to identify likely query classes. At step 155, the query classes that are likely to match are identified and the query is continued by limiting the next level search to one or more identified servers at the next search tier, such as server 108, and may limit signatures to the identified likely query classes. At step 156, the search for the query information is performed on the identified servers. In addition or alternatively, the search is performed on signatures with likely matching classification description.

A goal is to preserve the original audio signal while compensating for the interference and distortion by ignoring "interfering sections" or subtracting the estimated interference. Methods to detect interfering sources or different sources are discussed. These methods improve the accuracy and efficiency of audio content identification and speech recognition. Severe distortions due to interfering sounds and speaker interference reduce accuracy of identification and increase cost. Major improvements in identification are possible if the sources of interference are identified and their signals or impact is reduced. The method is also applicable to speech recognition. Although speech recognition products have made great progress, the accuracy currently deteriorates significantly below 10 dB SNR.

Figure 2A:
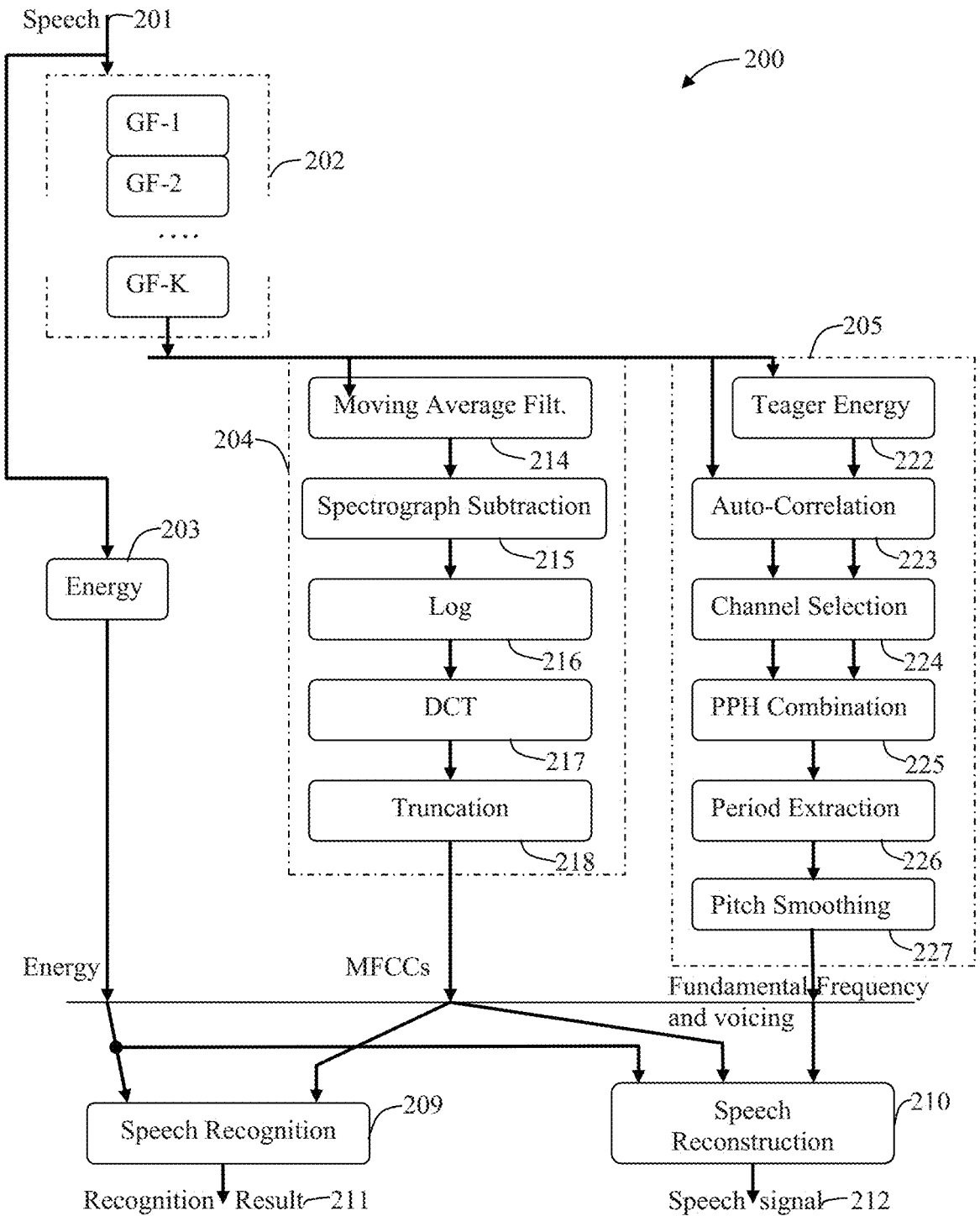
FIG. 2A illustrates an integrated audio process to generate speech features as well as MFCC coefficients for fingerprinting and speech recognition and reconstruction or interfering speaker cancellation in accordance with an embodiment of the present invention.

FIG. 2A illustrates an integrated audio process 200 to generate speech features as well as MFCC coefficients for fingerprinting and speech recognition and reconstruction or interfering speaker cancellation in accordance with an embodiment of the present invention. The extracted audio features are necessary for speech recognition or reconstruction. As described herein, speech reconstruction methods are used in one embodiment to remove interfering speakers.

An audio signal, including speech, is received at step 201 and is decomposed into a number of frequency bands based on an auditory model. The auditory model comprises of band pass filters at step 202 which decompose the audio signal into a set of K frequency channels. Fourth order gammatone filters, for example, are used to simulate the frequency response of the cochlear filters and the bandwidth of the filters is determined by an equivalent rectangular bandwidth (ERB) scale which gives wider bandwidth to filters located at higher frequency. Details for processing can be based on the ETSI Aurora standard, for example. The auditory model outputs a set of K band limited time-domain signals while a single filter bank vector is produced by mel filter bank every 10 ms, where mel represents a subjective pitch measure.

At step 202, gammatone filters process the incoming audio signal received at step 201. At step 204, the output of the multi-band gammatone filters is used by a mel-frequency cepstral coefficient (MFCC) calculation function. At step 205, a pitch calculation function is performed. At step 203, the energy of the incoming audio signal is calculated and output to step 209 and step 210, where speech recognition and speech reconstruction processing occurs. The MFCC calculation at step 204 involves moving average calculations at step 214, audio spectrum subtraction at step 215, log and or other function computation at step 216, discrete cosine transform (DCT) at step 217, truncation of DCT coefficients to generate the MFCC or local feature cepstral coefficient (LFCC) or equivalent coefficients at step 218. The pitch estimation function at step 205 involves Teager energy calculation at step 222, auto-correlation at step 223, channel selection at step 224, Pseudo Periodic Histogram (PPH) combination at step 225, period extraction at step 226, pitch smoothing and fundamental frequency/pitch calculation at step 227. The Teager energy calculation at step 222 is essentially calculating the modulating amplitude envelope of the filtered audio signal and enables the fundamental frequency to be tracked when only the higher harmonics are present. Normalized auto-correlation coefficients are computed at step 223 for each of the K filter outputs using 16 ms and 32 ms duration windows, for example. At step 224, channels where both the auto-correlation measurements at 16 ms and 32 ms peak at the same time lag are deemed relatively noise-free and are retained for further processing. Channels where the peaks do not occur at the same time lag are considered unreliable and discarded from further processing. At step 225, the auto-correlation coefficients from K' remaining channels, computed from the 16 ms duration window, are summed together to generate the pseudo periodic histogram (PPH). At step 226, using the PPH, the fundamental frequency is extracted by measuring the time between successive peaks. At step 227, smoothing of the detected pitch removes some noise for pitch estimation. Then at step 209, speech recognition takes place by classifying the inputs MFCC coefficients, pitch and energy, and generates the recognized word, or a chord or a tune if the input was music, at output step 211. At step 210, a speech signal can be reconstructed from the detected inputs and generate the speech output, at output step 212.

Figure 2B:
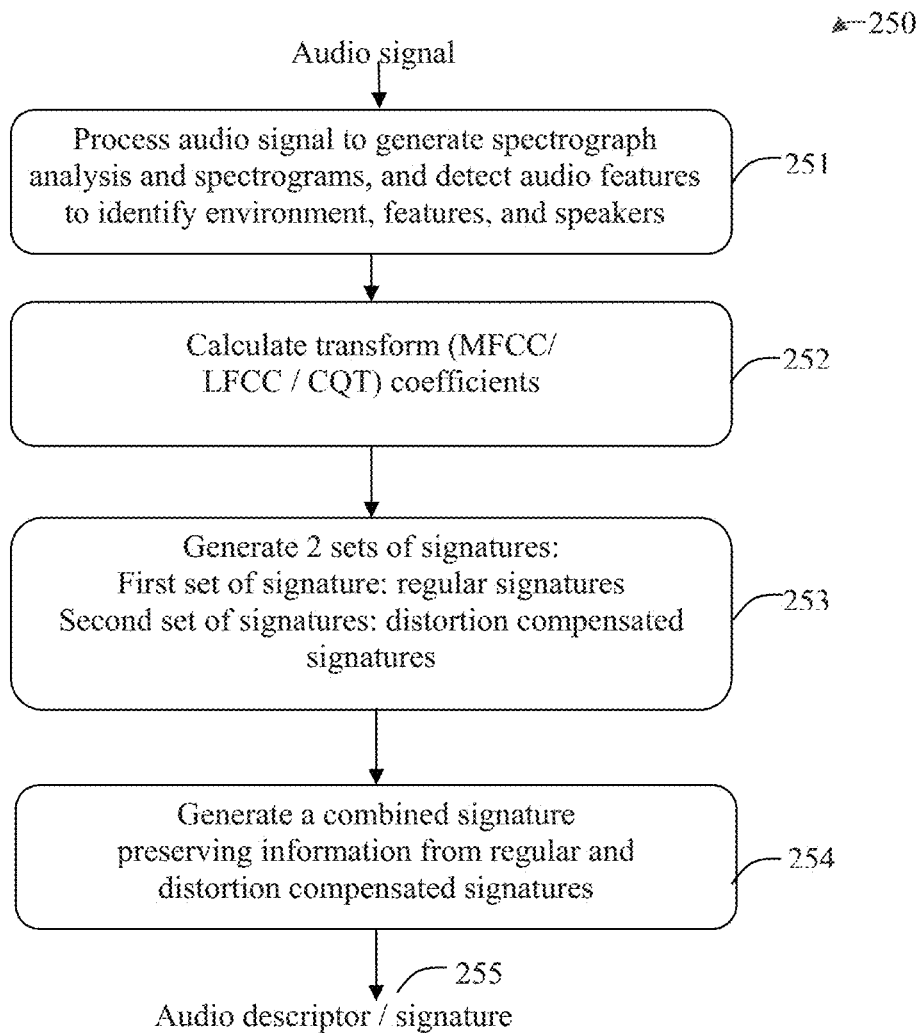
FIG. 2B illustrates a process to generate robust audio signatures that compensate for local audio environment and interference in accordance with an embodiment of the present invention.

FIG. 2B illustrates process 250 to generate robust audio signatures that compensate for local audio environment and interference in accordance with an embodiment of the present invention.

The process 250 detects likely distorting components generated from a device, such as a car radio, environment, such as street and wind noise when riding in a car, and other sources of noise or distortion such as from speakers and further compensates or reduces the impact of these distortions.

At step 251, the incoming audio signal is processed at the portable smart device 110, to generate audio spectrum analysis and spectrograms, detect audio features, identify environment, speakers, and features. At step 252, the MFCC, LFCC, and a constant-Q transform (CQT) coefficient transforms are computed and results are processed to detect features and associated data. Also at step 252, environment and distortions contributed by the device (device distortions) are compensated before computing the signatures and features for the associated data. At step 253, two sets of signatures are generated that aid in reducing, eliminating or marking interfering audio source components. The first set of signatures represent regular signatures for signals not receiving distortion compensation and the second set of signatures represent distortion compensated signatures. At step 254, the two sets of signatures are combined preserving information with distortion compensation or markings. A marking refer to a location where a distortion is likely to have occurred. Markings can aid in identifying places to be fixed, or where wrong deductions or speculations are eliminated, or to improve deductions/speculations within marked regions.

Figure 3A:
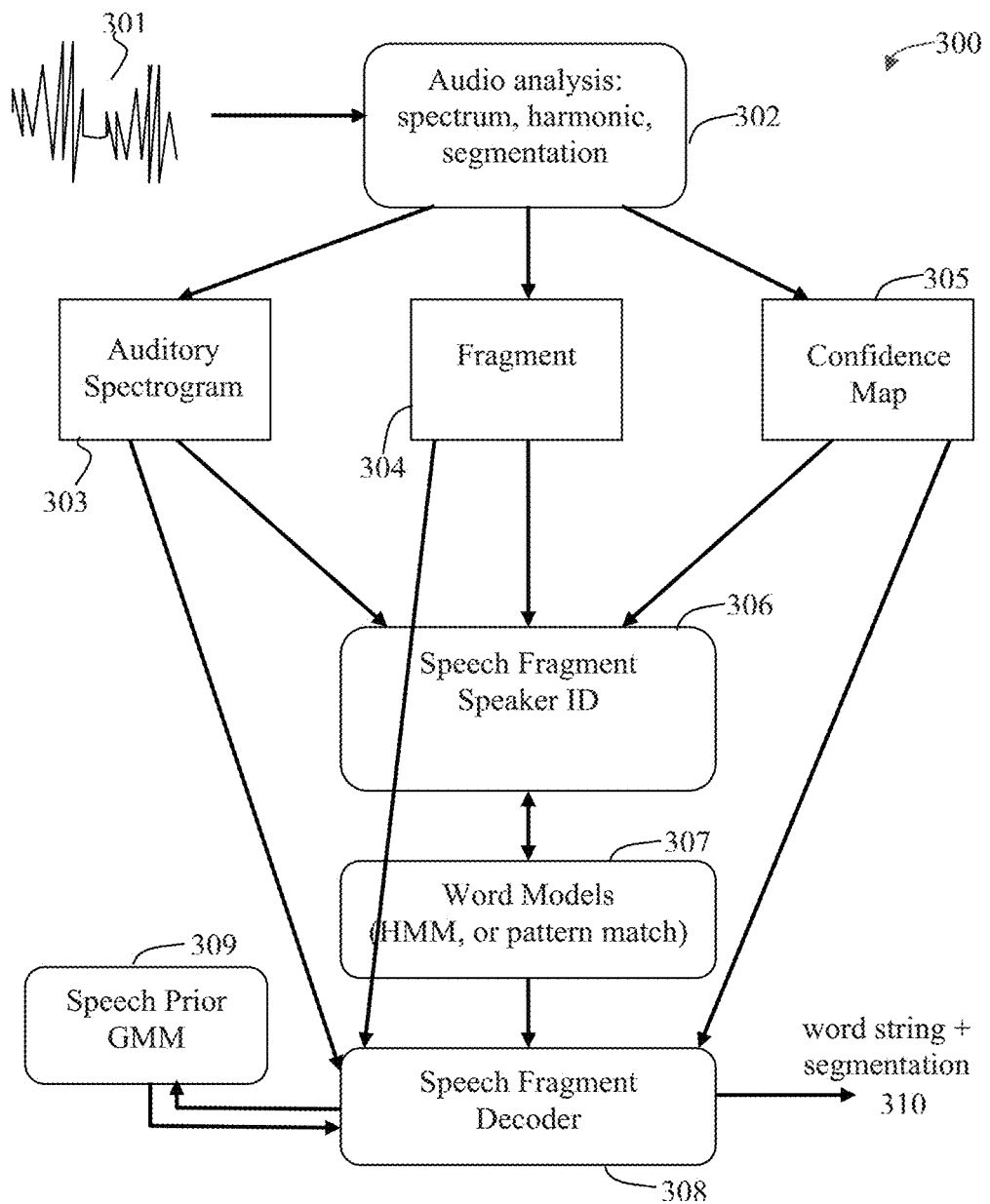
FIG. 3A illustrates a process to segment and separate multiple audio sources and speakers in accordance with an embodiment of the present invention.

FIG. 3A illustrates process 300 to segment and separate multiple sources and speakers in accordance with an embodiment of the present invention. Important observations and assumptions relating to the speech signal and speech energy include the following. First, the speech signal has redundant encoding, so that the speech remains intelligible even if large spectro-temporal regions are removed. Experiments using mutually exclusive frequency bands have demonstrated that there is no one frequency region that is essential for recognition. Second, speech energy is concentrated in local spectro-temporal regions. Third, the speech signal possesses certain continuities that allow spectro-temporal fragments of speech to be identified, and segmented from fragments of competing sources. At the speech audio level or speech FFT level there exist continuities in properties, such as pitch, energy envelope and spatial location in a spectrogram, for example. These continuities in properties by themselves may not offer a complete segregation of sources, for example, there may be breaks in pitch contour, and the energy envelope may have discontinuities. However, the pitch, energy envelope and spatial location may be sufficient to allow reliable clustering of time-frequency elements into local fragments. A second stage of analysis employs statistical models of speech that capture higher level structure, such as voice continuity qualities including vocal tract length, gender, and accent which can then be used to group the local fragments.

Even though there have been many years of research focused on robustness, automatic speech recognition (ASR) remains characterized by its fragility. This fragility is most apparent in the response of ASR to background noise. Mainly, ASR systems either employ close-talking microphones, for which a high signal-to-noise ratio can be assured, or they are designed to operate for small vocabularies in narrow specified conditions and highly predictable noise conditions.

Figure 3B:
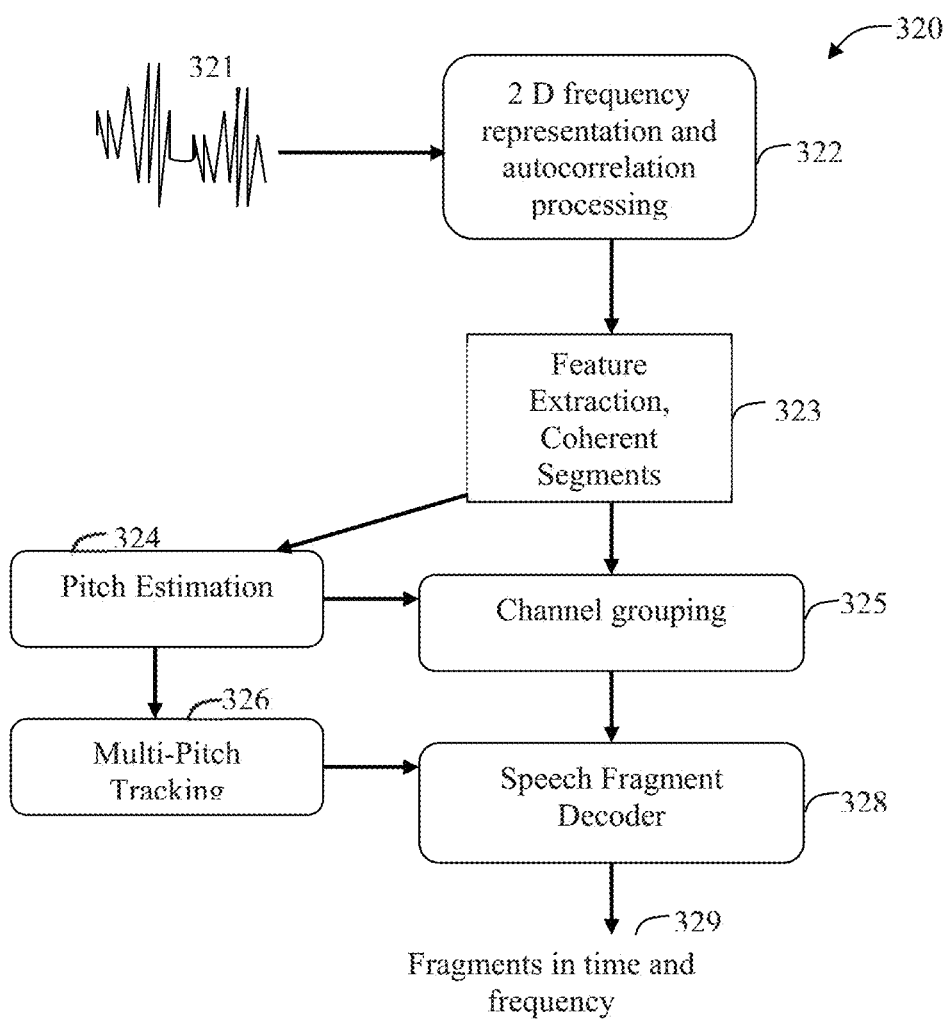
FIG. 3B illustrates details of the audio analysis at step 302 in FIG. 3A in accordance with an embodiment of the present invention.

The FIG. 3A illustrates an advanced speech detection method using speech fragment decoding (SFD). The audio input with disturbances is received at step 301 and processed at step 302. At step 302, the processing includes audio spectrum processing with a gammatone filterbank and processing signals in each channel to produce a 2 D representation of frequency and autocorrelation delay, such as by an auto-correlogram. At step 302, further audio processing involves a harmonic analysis and segmentation of the audio. FIG. 3B describes processing at step 302 in detail. An output of step 302 is received at step 303 which uses an auditory spectrograph to process the received signal with grammatone filters or other such filters that model the human auditory system. Another output of step 302 is received at step 304 where audio spectrograph fragments are generated using continuity. A further output of step 302 is received at step 305 which evaluates confidence in identifying speakers with a confidence map. At step 306, speaker identification is performed on outputs from the processing at steps 303, 304, and 305 which includes speech fragments. At step 307, the input received from step 306 is processed according to word models, such as hidden Markov model (HMM), or by use of a pattern match, where the steps 306 and 307 iterate as needed during the processing. At step 308, speech fragment decoding is performed using the speech fragments that correspond to one speaker, such as a foreground speaker. HMMs trained by applying a Vieterbi decoder for clean speech are used in speech detection analysis. Step 309 receives the word string output from step 308 to store prior speech. Step 309 assists the decoding process by helping fill the missing data in the speech models using speech prior Gaussian mixture models (GMM). The output "word string" is produced for each segmented fragment at step 310.

FIG. 3B illustrates details of the audio analysis 320 at step 302 in FIG. 3A in accordance with an embodiment of the present invention. At step 322, the received audio frames are filtered and auto-correlated at regular time intervals, such as 10-15 ms, and, a 2D representation of the frequency and auto-correlation delay (lag) is produced, which may be produced by an auto-correlogram for example. This 2D processing is done continually, separated by a time window, such as the 10-15 ms period. At step 323, processing includes feature extraction, such as extraction of sharp and dendritic features, and determining coherent segments. Multiple audio sources are identified and if segments belong to likely interfering speakers, they can be conditionally removed. All independent segments and related segments may be conditionally removed post-priori based on response for actual search, which will indicate what time segments are not aligned to possible matches.

At step 324, the auto-correlogram representations are processed to produce robust pitch estimates for coherent segments and for multiple simultaneous sources. At step 325, at each time frame, the filter channels are grouped across-frequency into "channel groups" if they appear to be dominated by the same harmonic source, as determined by comparing the periodicity of the signal in each filter channel with the harmonic source pitches. Hence each channel group is associated with a single pitch estimate in appropriate coherent segments.

At step 326, channel groups are integrated through time using a multi-pitch tracking algorithm. At step 326, segments are combined that are related or similar. These segments are labeled together for post-processing speech cancellation processes. The multi-pitch tracking algorithm is based on an HMM to model change of voicing state of the speech source and a simple model of pitch dynamics within voiced segments. In an embodiment of this invention, independent HMMs are used to model each speech source, and a separate noise process is used to model the spurious pitch estimates generated by the pitch detection algorithm at step 324. Viterbi decoding is then able to form the likely description of data in terms of mutually overlapping pitch track segments.

At step 328, speech fragment decoder generates speech fragments. It groups connected segments together as speech fragments, for possible post-processing or alternate speech and search combinations. The audio spectrum and temporal information of these speech fragments is used to enhance desired audio source, and reduce interfering source in downstream processing. The channel groups are integrated into the same spectro-temporal fragment if their pitch estimates lie on the same pitch segment. At output step 329 generated fragments in time and frequency are output.

Figure 3C:
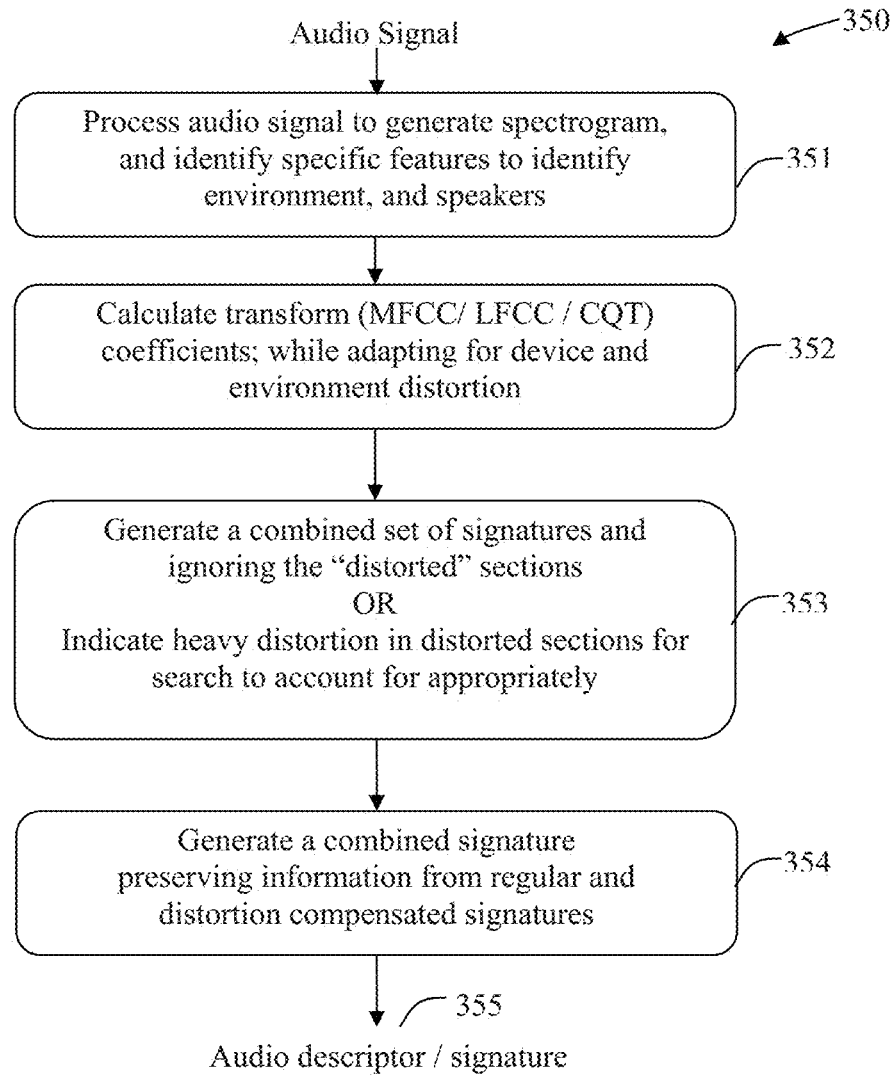
FIG. 3C illustrates a process to generate robust audio signatures that eliminate or mask signatures during heavily distorted sections of query in accordance with an embodiment of the present invention.

FIG. 3C illustrates a process 350 to generate robust audio signatures that eliminate or mask signatures during heavily distorted sections of query in accordance with an embodiment of the present invention. The process 350 detects likely distorting components from device, such as a car radio, environment, such as street and wind noise when riding in a car, and other sources of noise or distortion such as speakers and further compensates or reduces the impact of these distortions.

At step 351, the incoming audio signal is processed at the portable smart device110, to generate spectrograms and audio spectrum analysis, detect audio features, identify environment, speaker, and features. At step 352, environment and device distortions are compensated for before computing the signatures and features for associated data. At step 352, the MFCC, LFCC, and a constant-Q transform (CQT) coefficient transforms are computed to detect features and associated data. Also at step 352, the portable smart device 110 adapts for device and environment distortions. At step 353, a combined set of signatures are generated and the signatures are processed to ignore or mark interfering audio sources which may be heavily distorted. At step 354, a combined second set of signatures are generated preserving information from regular and distorted compensated signatures. The signatures are combined and processed with distortion compensation or marking.

Figure 4A:
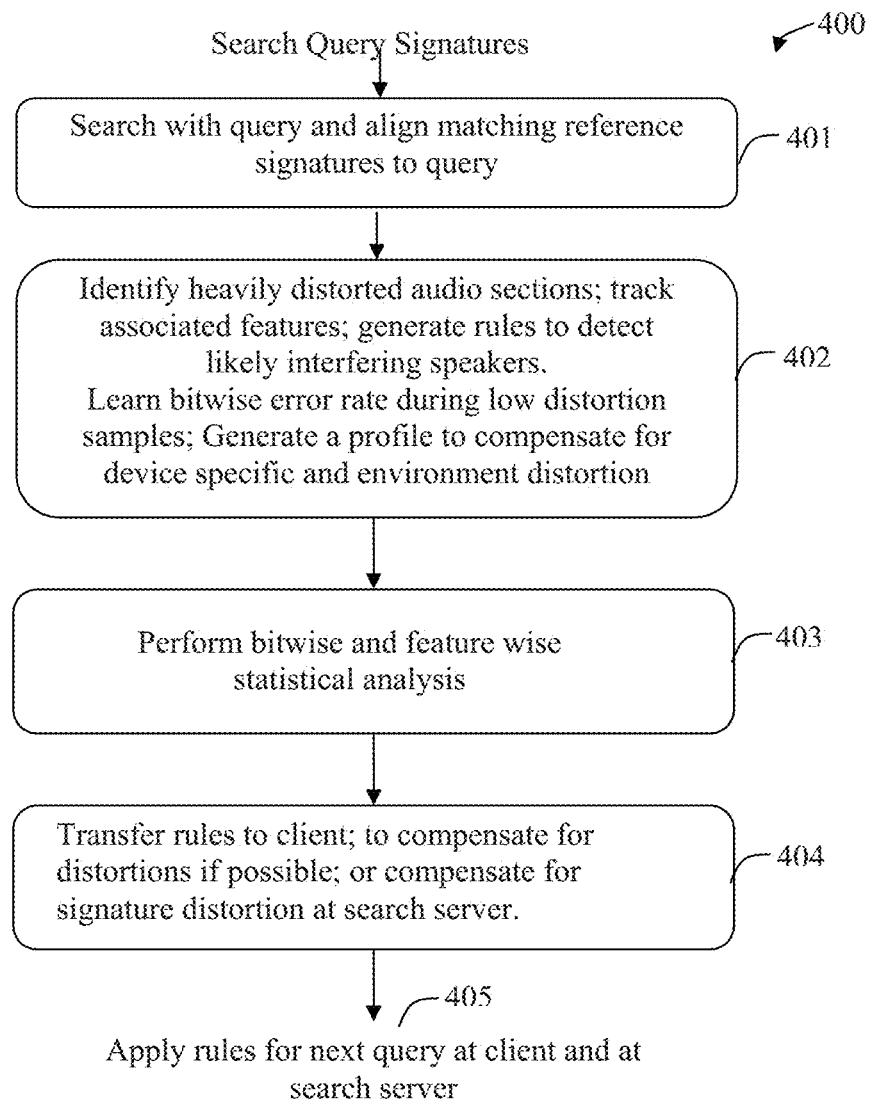
FIG. 4A illustrates a process for learning of rules to detect device and environment distortion and to detect likely interfering speakers or sources in accordance with an embodiment of the present invention.

FIG. 4A illustrates a process 400 for learning rules to detect device and environment distortion and to detect likely interfering speakers or sources in accordance with the present invention. The process 400 performs statistical analysis between matching query and reference signatures and features to detect basic device and environmental distortions. The detected distortions are learnt and sent to the portable smart device 110 so compensation can be made for the detected device and environment level distortions.

At step 401, a query search is performed with query signatures and matching signatures of the query and reference content are identified. At step 402, the signatures are processed to mark interfering audio sources. For example, heavily distorted audio sections are identified. Features associated with the distorted audio sections are tracked are tracked in time by peak, size, and shapes alignment. Based on the distorted audio sections, rules are generated to detect likely interfering speakers. Rules are generated to identify likely interferers. For example, likely interferers may be previously identified family members, friends, or even devices. So, a speaker ID function can be used to identify these people, and if these speakers sound is present in a signal, they can be removed when the device is trying to recognize a radio song, or if the owner is making a request to the device. In these cases, a friend's speech is an interference. When low distortion samples are received, a bitwise error rate is learned. At step 403, statistical analysis is performed between the matching query and matching reference content, and the information about the client device and environment (location, and manner of holding the device) distortions are computed and stored at the server or at the client device. When sufficient observation is made to create a rule, the compensating rules are sent to device and used to compensate for the distorting condition (device level aspects, neighboring environment) at step 404.

Figure 4B:
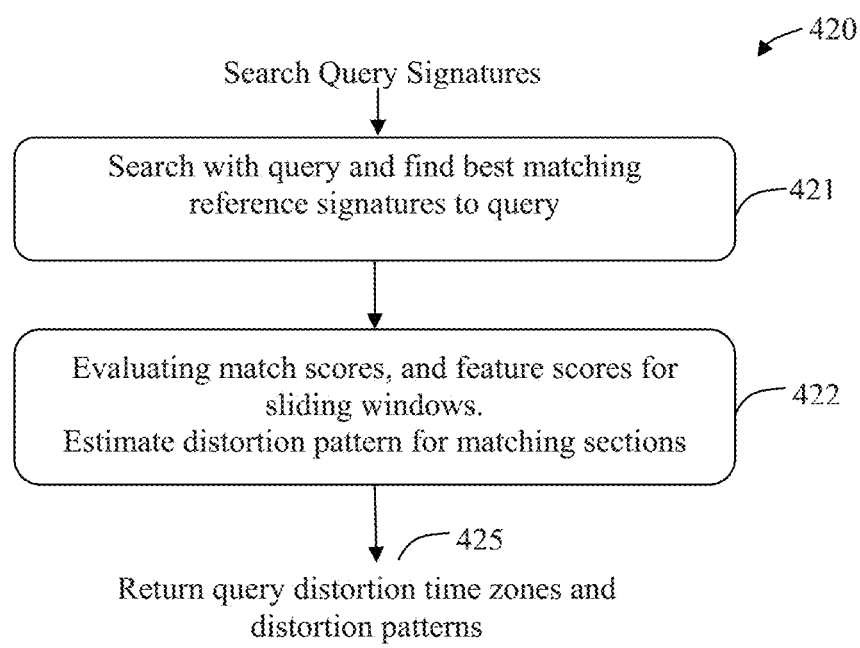
FIG. 4B illustrates a process to detect distortion time zones and distortion patterns and modes at each time zone and overall query in accordance with an embodiment of the present invention.

FIG. 4B illustrates a process 420 to detect distortion time zones and distortion patterns/modes at each time zone and overall query in accordance with the present invention. The process 420, operating on the portable smart device 110, maintains sliding window scores while performing correlation on expected matches, and keeps track of relatively "undistorted" matching segments. A sliding window is a fixed time window, such as 10-15 ms that moves along an audio sample. For reference, segments refer to connected or very close features. Sections refers to larger regions where matching occurs. Windows with low scores are marked as distortion sections, also referred to as distortion time zones. For the better matching segments, distortion analysis is performed so that further compensation can be attempted.

At step 421, search query signatures are received, a search is performed using the received search query signatures, matching query signatures and reference signatures are determined, and the best matched content is identified. When a match is found, a closer look is taken at features in query and reference to make fine determinations of matching results. At step 422, the signatures are processed creating sliding windows, scores of the sliding windows are compared, and the good matching segments and poorly matching segments are recorded. While both segments may have distortion, the poorly matching segments is considered to have distortion that affects the matching process. When binary signatures are compared, a distance measure between them can be used to score a match. For the good matching sections and the poorly matching sections, statistical analysis detects distortion patterns and evaluates if distortion compensation is possible on both sections. At step 425, query distortion time zones and distortion patterns are output.

Figure 4C:
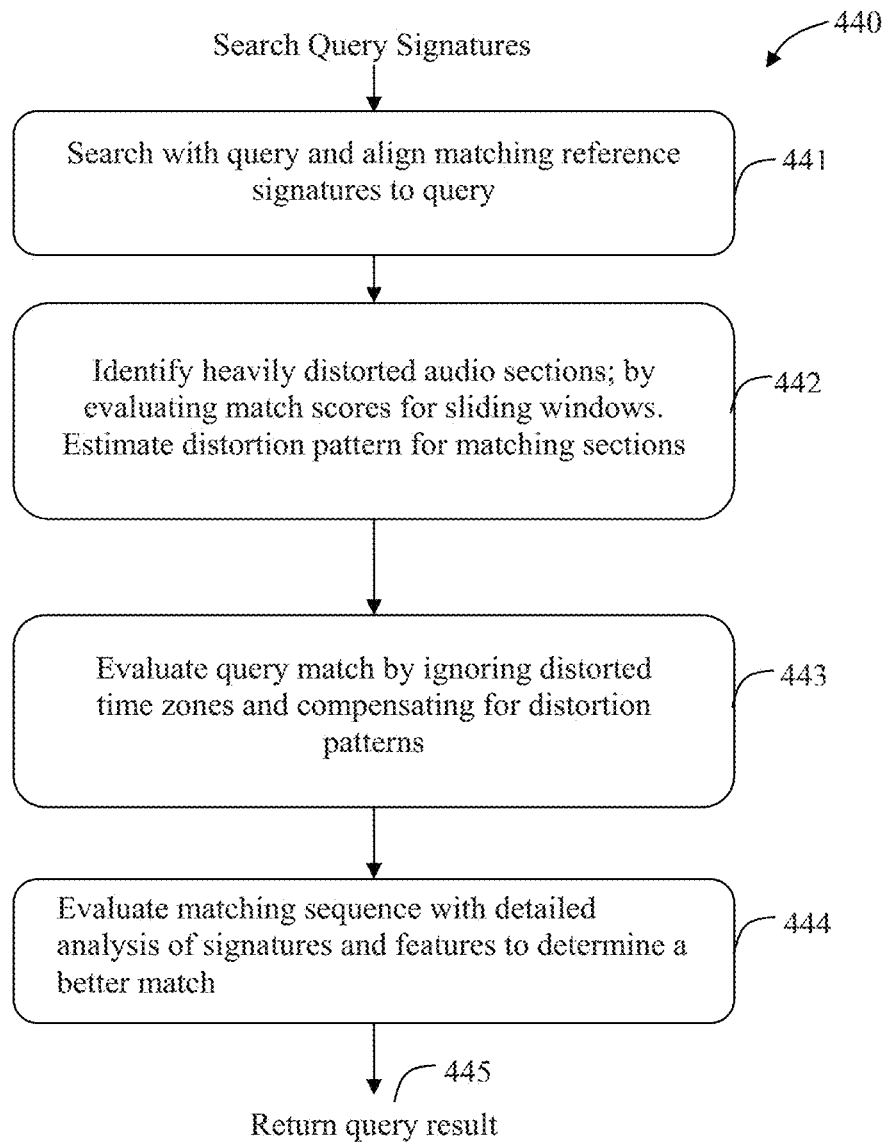
FIG. 4C illustrates a process for compensating detected "distortion zones" and distortion patterns at the portable smart device in accordance with an embodiment of the present invention.

FIG. 4C illustrates a process 440 for compensating detected "distortion time zones" and distortion patterns at client in accordance with an embodiment of the present invention. The process 440 maintains sliding window scores while performing correlation on expected matches, and keeps track of relatively "undistorted" matching segments. Sliding windows with low scores are marked as distortion time zones. For the better matching segments distortion analysis is performed so that further compensation can be attempted, or rules determined for learning compensation. At energy levels determined at the portable smart device 110, audio segmentation techniques and/or matching with known interfering patterns can be used to assist in detecting "distortion time zones". As described in FIG. 3B, related speech segments are grouped and tracked, so that speech fragments from interfering sources can be reduced, while true audio source can be enhanced.

At step 441, a search query signatures are received, a search is performed using the received search query signatures, and matching query signatures and reference signatures are determined, and the matched content is identified. At step 442, the query signatures are processed and scores of sliding windows are compared, and the good matching sections and poorly matching segments are recorded. The poorly matching segments are considered distortion time zones. For both the good and poor matching sections, statistical analysis is performed to detect distortion patterns and to evaluate if distortion compensation is possible for either or both segments. At step 443, correlation is performed using the good matching segments and/or compensated low matching segments. A query match is evaluated by ignoring distortion time zones and/or compensating for distorted patterns based on the detected distortion patterns. Time zones that cannot be compensated or do not improve a matching score are ignored. At step 444, evaluate likely matching sequences with a detailed analysis of signatures and features to determine a better match. A better match provides a better score, and even duration. A better match improves confidence that the reference is correct, so that more references can be detected correctly, and fewer false positives generated. At step 445, query results including matching reference with time alignment between reference and query, match scores, and for speech the matching "text" are output.

The detection of "distortion time zones" and distortion patterns in the query generated on the portable smart device 110 can also be performed at the server 108 during search and correlation. Since the server 108 has more information on the reference, and can also have an acoustic profile of the query sent from the portable smart device 110, the server 108 can perform more elaborate analysis to identify different and finer segments, which may represent interfering sources.

The identifying step 442 and the evaluating steps 443 and 444 are repeated for a new position of the sliding window after a pre-specified gap, such as the 10-15 ms gap, between the first position and the new position to determine a better match.

Figure 5A:
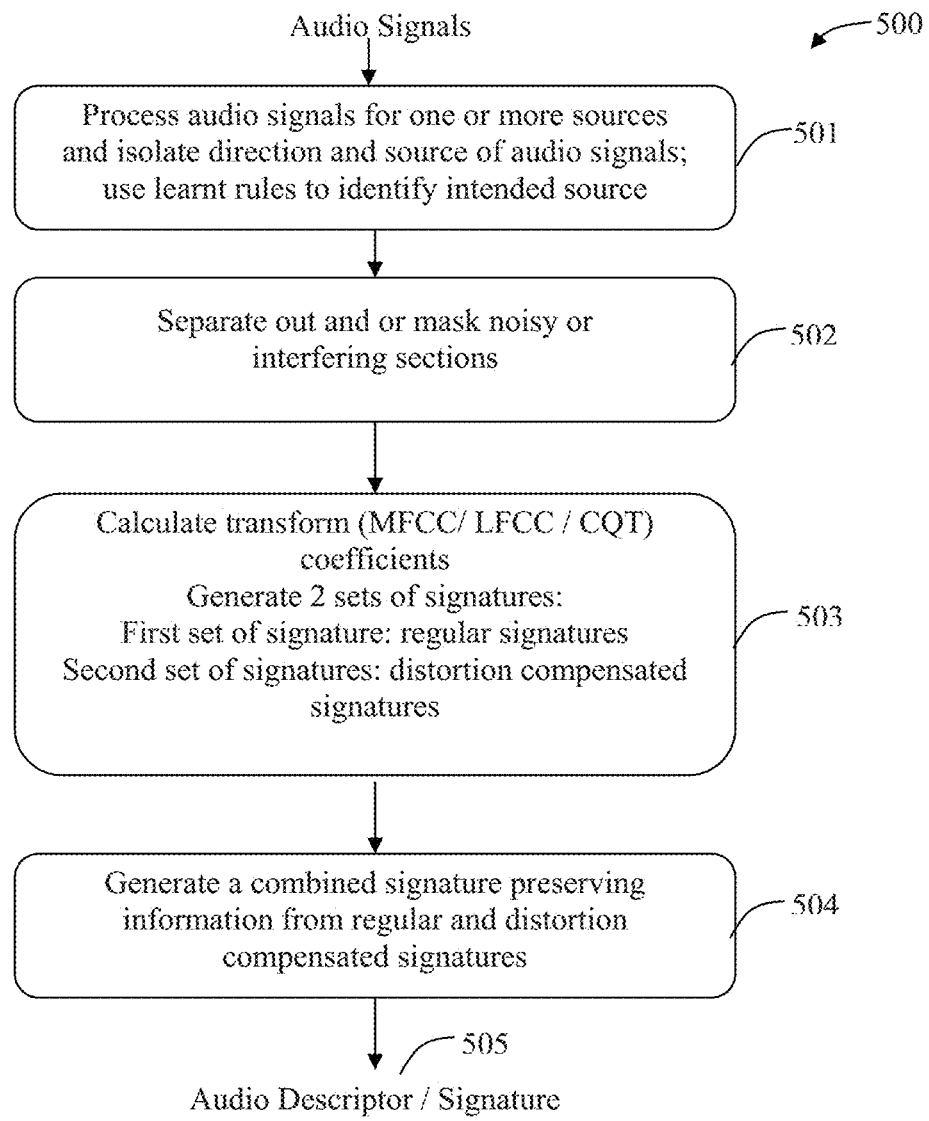
FIG. 5A illustrates with a process for detection of interfering sources using multiple microphones, and speaker identification in accordance with an embodiment of the present invention.

FIG. 5A illustrates with a process 500 for detection of interfering sources using multiple microphones, and speaker identification in accordance with an embodiment of the present invention. The process 500 detects likely distorting audio sources by performing sound source separation and identifying specific distortion and interference from a device, such as a car radio, environment, such as street and wind noise when riding in a car, and sources of noise or distortion, such as speakers. After source separation and interference identification, the process 500 reduces the impact of these distortions or interfering sources.

At step 501, the incoming audio signals from one or more sources are processed at the portable smart device 110, to isolate direction and separate the sources of the audio signals. Using source direction, speaker identification and context, the portable smart device 110 creates a likely sorted list of the sources using established and learnt rules. At step 502, noisy or interfering sections of audio are reduced or ignored by use of masking. Also at step 502, other interfering sources, environment, and device distortions are compensated. At step 503, the MFCC, LFCC, and CQT coefficient transforms are computed and features are further processed at step 503 to generate signatures and associated data. At step 503, two sets of signatures are generated that aid in reducing, eliminating or marking interfering audio sources. The first set of signatures represent regular signatures and the second set of signatures represent distortion compensated signatures of the interfering audio sources. At step 504, the two sets of signatures are combined preserving information with distortion compensation or markings. Also at step 504, the signatures are processed to ignore and/or mark interfering audio sources. At output 505, the combined signatures, distortion compensated signatures, associated descriptors, and marked interfering audio sources if detected are output.

Figure 5B:
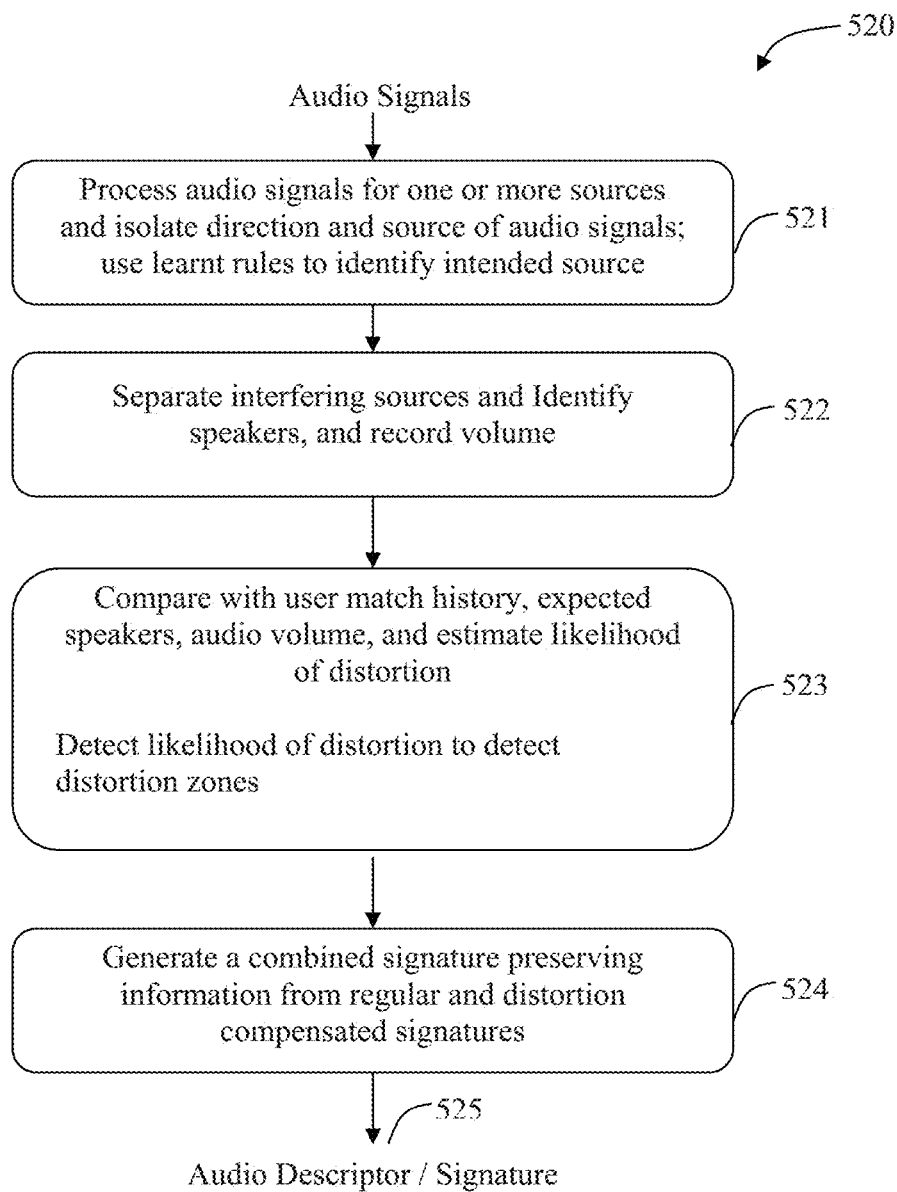
FIG. 5B illustrates with a process to detect likely distortion time zones with audio processing in accordance with an embodiment of the present invention.

FIG. 5B illustrates with a process 520 to detect likely distortion time zones with audio processing in accordance with an embodiment of the present invention. The process 520 detects likely distorting audio sources by performing sound source separation and identifying specific distortion and interference from a device, such as a car radio, environment, such as street and wind noise when riding in a car, and sources of noise or distortion, such as speakers. After source separation and interference identification the process 520 reduces the impact of these distortions or interfering sources.

At step 521, the incoming audio signals from one or more sources are is processed at the portable smart device 110, to isolate direction and separate the sources of the audio signals. At step 522, interfering sources are separated, speakers are identified, and volume levels are recorded. At step 523, compare with user match history, expected speakers, audio volume, and estimate likelihood of distortion to detect distortion zones in the query. Previous matches and history of use and analysis by time of day can be preserved. Before current match result at step 523, the audio levels, and other environment factors can be used to guide distortion estimation, detection, and compensation. At step 524, generate a combined signature preserving information from regular and distortion compensated signatures. At step 525, the signatures and associated descriptors are output after audio signal processing and interference compensation is completed at step 524.

Figure 5C:
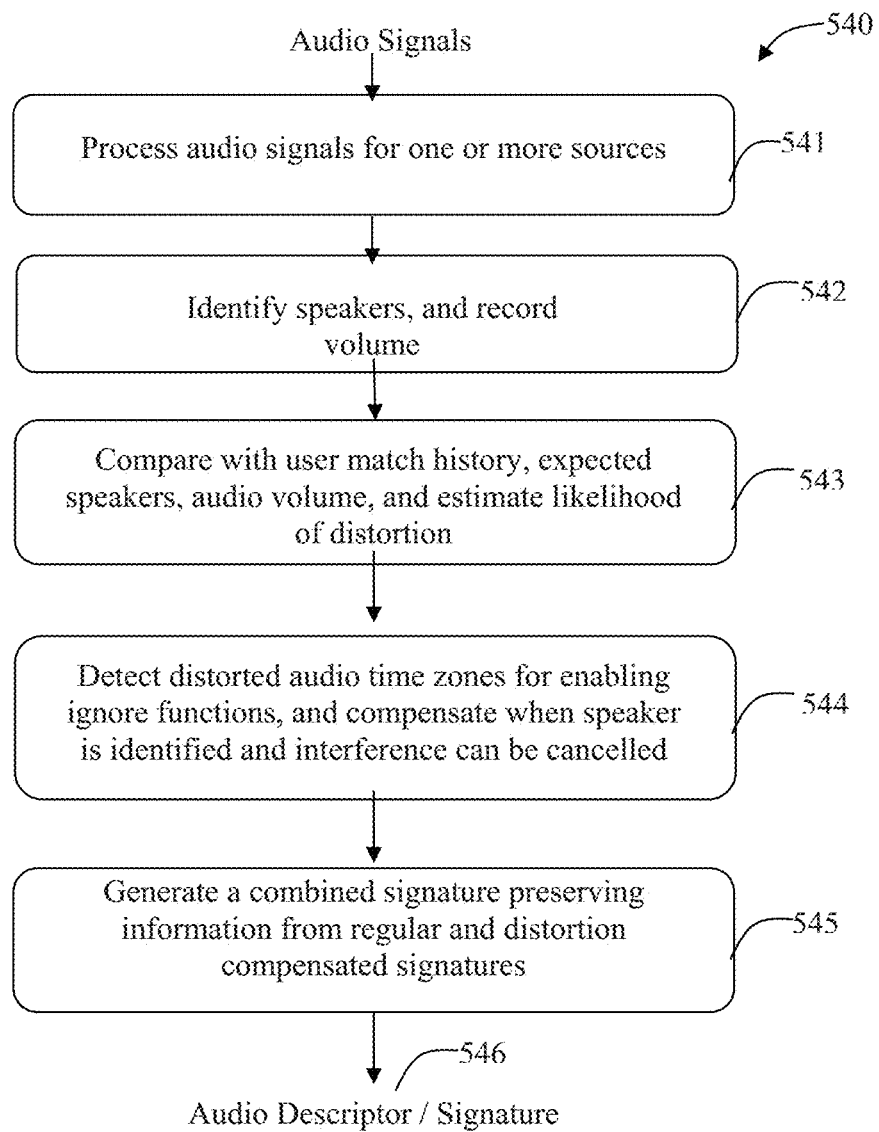
FIG. 5C illustrates with process to compensate for interference during likely distortion time zones with audio processing in accordance with an embodiment of the present invention.

FIG. 5C illustrates with a process 540 to compensate for interference during likely distortion time zones with audio processing. The process 540 detects likely distorting audio sources by performing sound source separation and identifying specific distortion and interference from a device, an environment and sources such as speakers. After source separation and interference identification, the process 540 compensates the impact of these distortions or interfering sources.

At step 541, the incoming audio signals are processed at the portable smart device 110, to separate audio sources. At step 542, interfering source are separated, speakers are identified, and volume levels are recorded. At step 543, compare expected speakers from user match history, audio volume, and estimate likelihood of distortion. At step 544, distorted audio time zones are detected for enabling ignore functions. If an improvement is indicated, compensation is provided when a speaker is identified and known interference such as an identified interfering speaker is canceled. Correlation scoring may be used to determine whether an improvement is likely. At step 545, generate a combined signature preserving information from regular and distortion compensated signatures. At step 546, the signatures and associated descriptors are output after audio signal processing and interference compensation is completed at step 544.

FIG. 6 illustrates field formats 601-603 used in a fuzzy search process using features with distortion compensated or alternate fields for database access in accordance with an embodiment of the present invention. Fuzzy search does not treat all sections of the query similarly. It can reduce a weighting or ignore some query sections completely if the fuzzy search process determines that these sections are disturbed significantly by interference. Fuzzy search also allows the possibility of recalculating the likelihood of a match by considering alternate signatures for sections of the query. The fields shown in unit 601 include a 16b Coefficients field, a 4b Band ID1 field, a 4b audio spectrum entropy trend values field, and a 4b Feature ID1 field which are added to a lookup index, such as a traversal hash index which is a compact hash of a signature. When interference is present in a query audio signal, the traversal hash index or hash key bits and the Band ID1 field and or audio spectrum entropy trend values field or feature ID1 field may change in the query. To allow for robust detection, fuzzy search utilizes hash lookups where Band ID2 substitutes for Band ID1 in unit 602. Similarly, in unit 603, another fuzzy search example shows that Band ID2 substitutes for Band ID1, and Feature ID2 substitutes for Feature ID1. The units 601, 602, and 603 are added to a lookup index, such as the traversal hash index.

In an embodiment, fuzzy search includes a signature search with a variety of selected signature field combinations to extract likely matches followed by search match likelihood analysis.

In another embodiment, the signatures are generated by combining different fields of various signatures and descriptors and features. To generate a more robust signature set for speech and other source interference, a few interesting field combinations of different signatures and features are learnt by experiments or data analysis. Signatures and associated features if present are considered to be removed together in the following examples. For example, a first signature combination provides compensation for interfering speakers that are known by removing signatures associated with the interfering speakers and preserving the "intended source". A second signature combination is obtained by removal of signatures associated with only dominant sections of interfering speakers. A third signature combination includes remove of signatures associated with ambient noise contribution, such as traffic noise when in car, car noises, and in other settings, removal of signatures associated with babble noise such as may be received in large public gatherings.

Figure 7A:
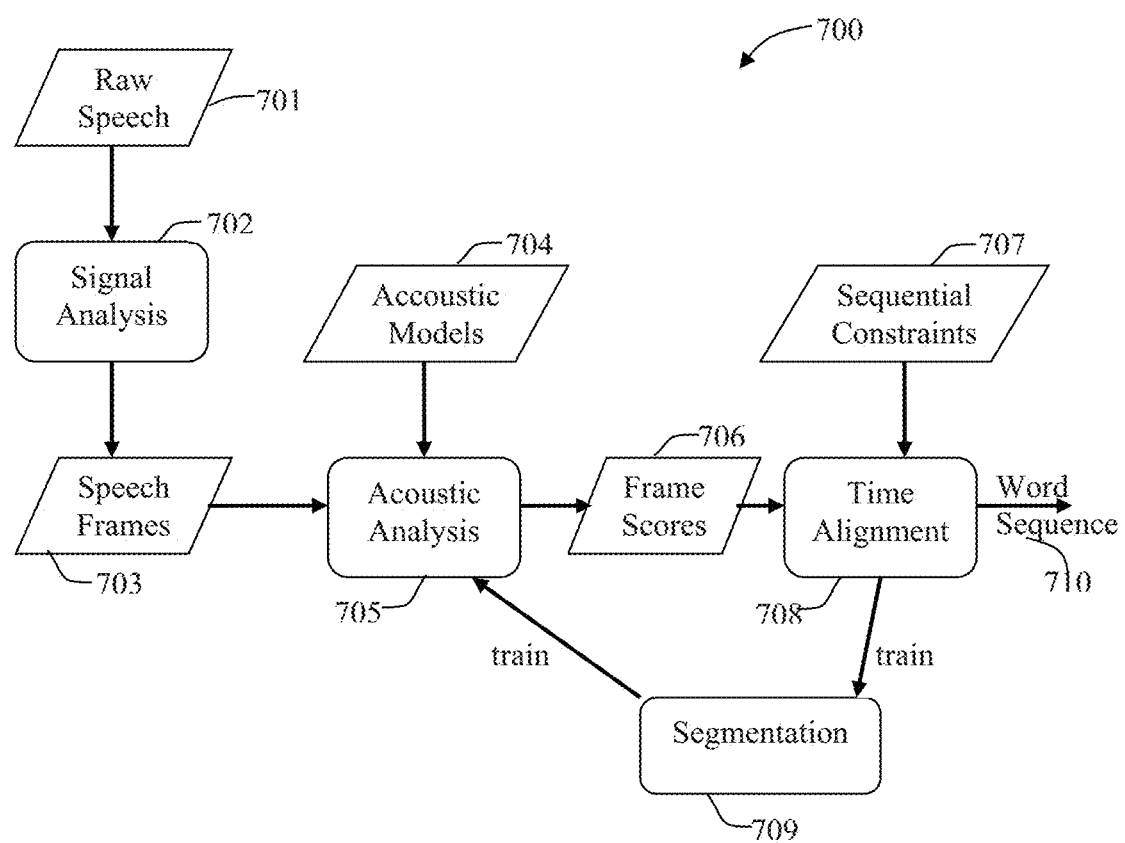
FIG. 7A illustrates a speech recognition system in accordance with an embodiment of the present invention.

FIG. 7A illustrates a speech recognition system 700 in accordance with an embodiment of the present invention. At step 701, a raw audio signal in received which is processed using signal analysis at step 702. At step 703, speech frames are generated. At step 705, the speech frames undergo acoustic analysis using acoustic models accessed from storage at step 704. At step 706, likely phonemes are scored by use of a Hidden Markov Model (HMM) on the speech frames to detect the probabilities of likely phonemes. At step 708, a phoneme time alignment is performed using phoneme probabilities generated from step 706, and using sequential and timing constraints defined at step 707. The sequential constraints define the sequence of phonemes possible, and which can be language or dictionary specific. At step 709, the audio is segmented into different speech phonemes, and or sounds, and returned to step 705 for training and learning. The step 708 produces a detected word sequence, which is output at step 710.

Figure 7B:
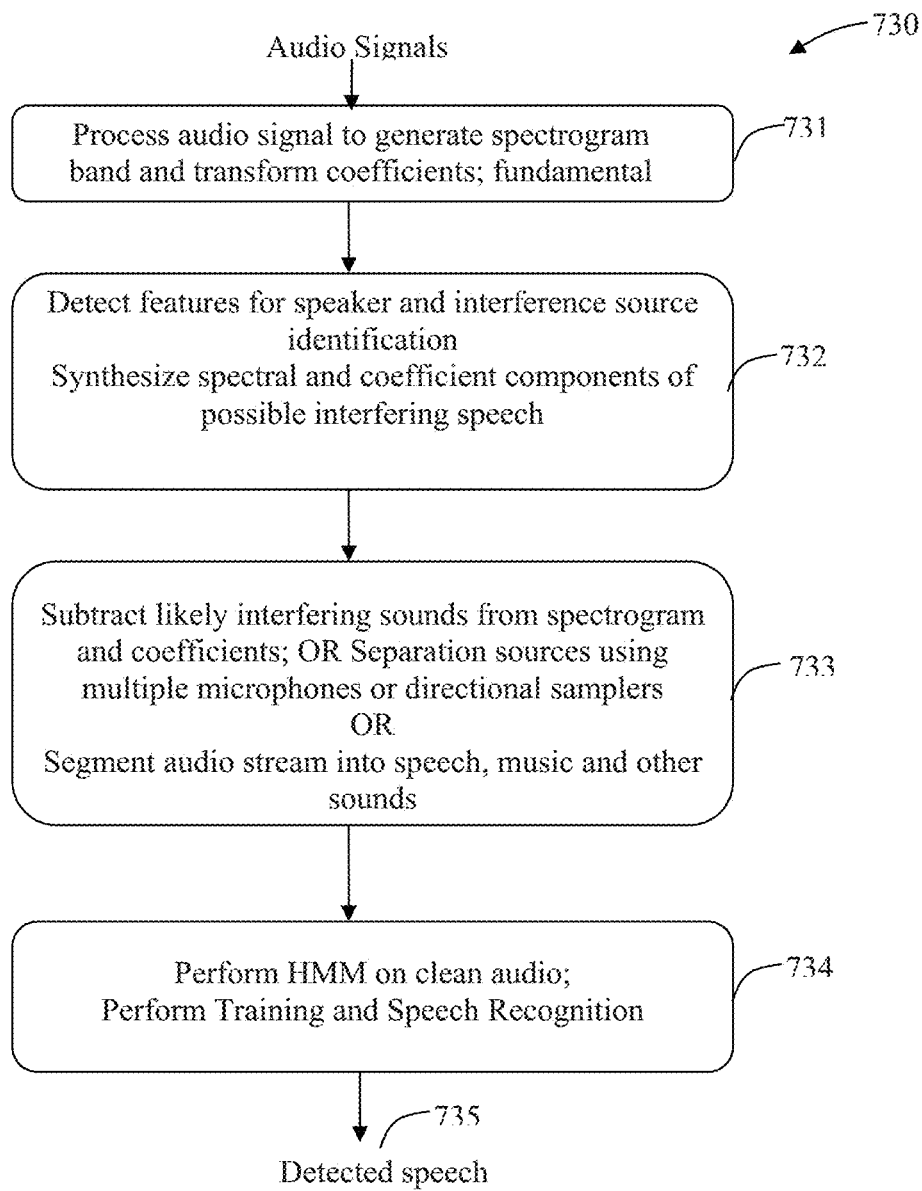
FIG. 7B illustrates with a process for robust audio speech recognition by canceling out detected audio components of identified interfering sources such as known interfering speakers in accordance with an embodiment of the present invention.

FIG. 7B illustrates a process 730 for robust audio speech recognition by canceling out detected audio components of identified interfering sources such as known interfering speakers in accordance with an embodiment of the present invention. At step 731, an audio signal is processed to generate a spectrogram and transform coefficients including a fundamental frequency, and formants, F1, F2, F3, . . . . Then at step 732, features for speaker and interference source identification are detected. Step 732 also includes the identification of multiple interfering sources according to use of multiple microphones or directional samplers. Also at step 732, internal steps are taken to synthesize or isolate one or more interfering audio signals. For example, from a spectrogram and coefficient components of a detected possible interfering speech, likely interfering sounds are synthesized. At step 733, the likely interfering sounds are subtracted from the spectrogram or coefficients to form clean audio. If multiple interfering sources are identified, the multiple interfering sources are also separated in the formation of the clean audio. Further, if speech and additional sounds are detected, the audio stream is segmented into separate sources for speech, for music and for other sounds. At step 734, a hidden Markov model (HMM) is performed on the clean audio to detect the speech phonemes. Also at step 734, the HMM is trained for speech recognition before the next audio signal is received. The detected speech phonemes are produced as a result at output step 735.

Figure 7C:
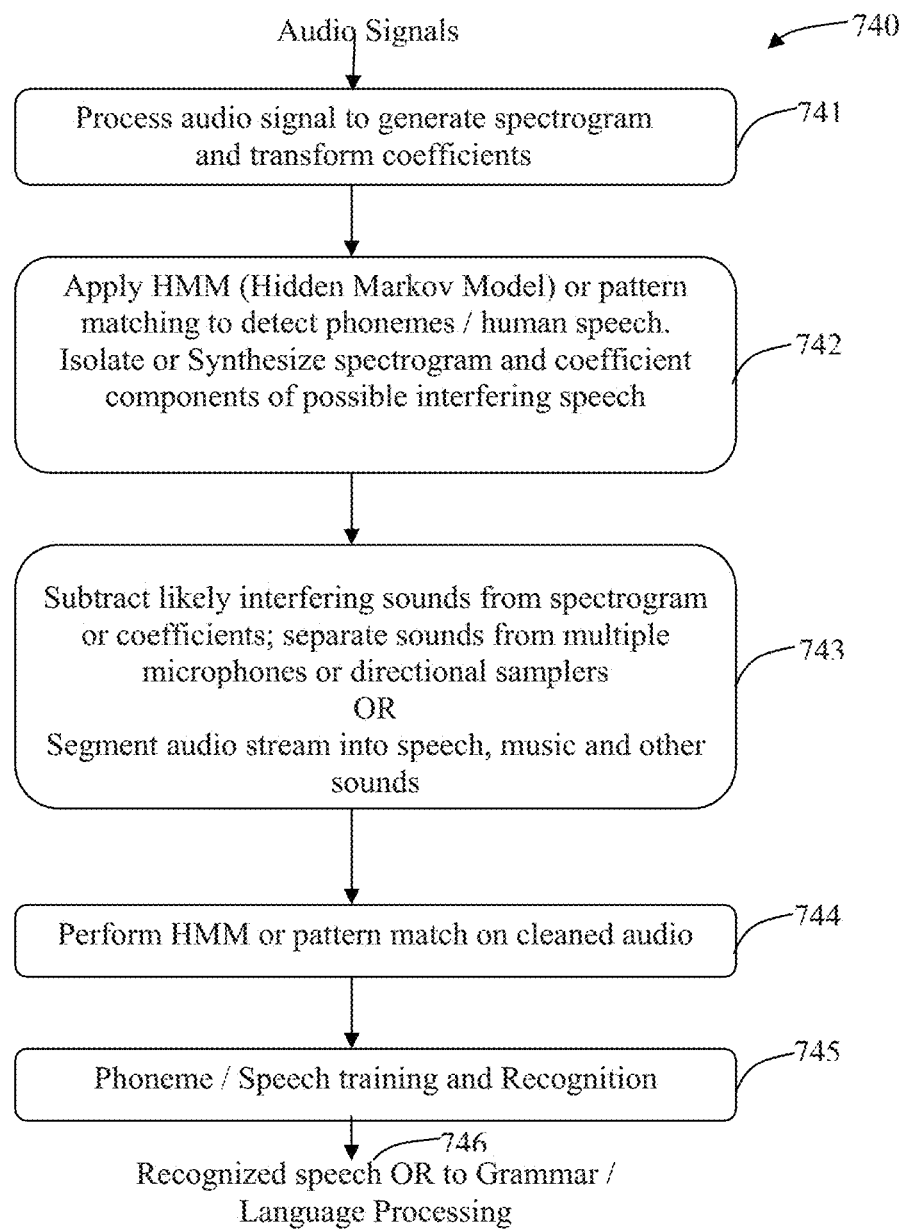
FIG. 7C illustrates with a process for robust audio speech recognition with compensation for detected audio interfering sources such as known interfering speakers in accordance with an embodiment of the present invention.

FIG. 7C illustrates a process 740 for robust audio speech recognition with compensation for detected audio interfering sources such as known interfering speakers in accordance with an embodiment of the present invention. The likely interfering source is detected by methods including source separation using multiple microphones, directional samplers and audio segmentation. At step 741, an audio signal is processed to generate a spectrogram and transform coefficients. Then at step 742, the coefficients are processed using HMM or other state based model or pattern matching based method to detect phonemes/human speech. Next, spectrogram and coefficient components of possible interfering speech are isolated from the input audio or synthesized or alternatively query sections with the interfering speech and sound are ignored.

At step 743, likely interfering sounds are subtracted from the spectrogram or coefficients to form clean audio. Also, at step 743, sound sources are separated by using information from multiple microphones or directional samplers. Alternatively, even though query sections with interfering speech and sound have been ignored in step 742, the audio stream can still be segmented into speech, music and other sound fragments to further reduce any interfering sounds.

At step 744, a Hidden Markov Model (HMM) is performed on the clean audio to detect the speech phonemes. At step 745, initial training for speech recognition is performed to train the HMM used at step 744. At step 746, the recognized speech phonemes are output or information is sent to grammar and language processing. These steps map phonemes to desired speech dictionary, and convert the phonemes to likely speech as a text output.

Figure 8:
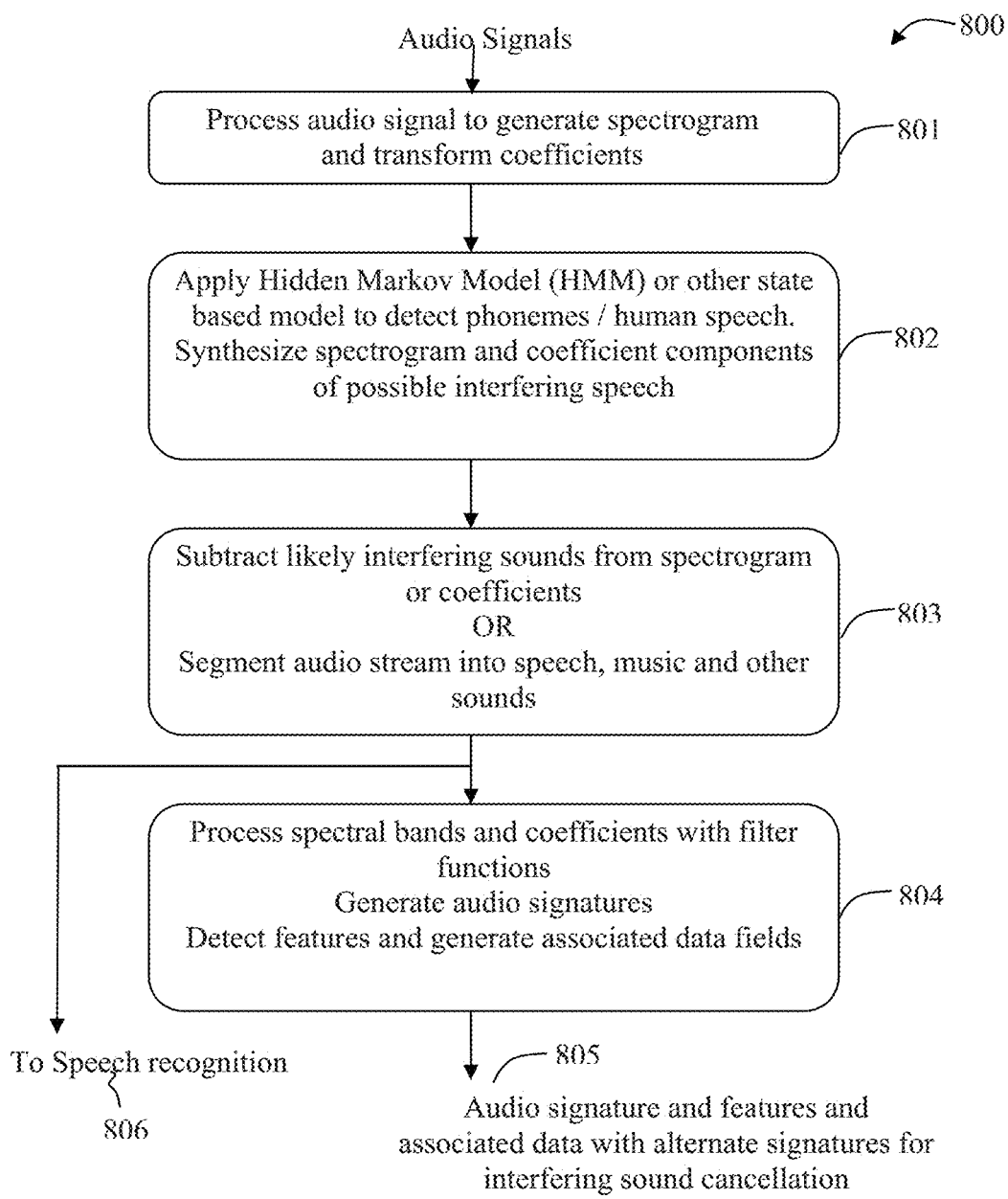
FIG. 8 illustrates with a process to generate robust audio signatures by canceling out detected audio components of known interfering sources such as known interfering speakers in accordance with an embodiment of the present invention.

FIG. 8 illustrates with a process 800 to generate robust audio signatures by canceling out detected audio components of known interfering sources such as known interfering speakers in accordance with an embodiment of the present invention. At step 801, incoming audio stream is processed to generate spectrogram energy and coefficients of transforms such as LFCC and MFCC. The spectrogram energy and coefficients are generated using filtering functions that generate impulse energy per band and coefficients. At step 802, the HMM or other state based model are applied to detect phonemes of speech, and detect other sounds such as chords, and specific sounds such as laughter, gunshot, screams, and applause. In an audio fingerprint application in a noisy, living room environment, the above speech analysis can be used to segment out speech, music, and other sound components to improve robustness of the audio fingerprinting solution.

At step 803, the detected specific audio sounds are used to separate the original sounds from interfering sound. Specifically, detected sounds can be used as features to preserve in the original audio. Additionally, different sounds can be segmented, or cancelled with the intent to preserve the original sounds and be able to create some fingerprints that represent the original audio resulting in more accurate matching with low signature matching error. At step 806, the results of step 803 are output to a speech recognition process such as described above with regards to FIG. 7B process 730.

At step 804, for each time sample for which audio signatures are generated, prominent features are detected. Spectrogram bands with impulse energy that is strongest or among the strongest are identified. The identified spectrogram band's bit index value is utilized to contribute to generating a hash index for signature access, and for associated data to be used during search and correlation. For example, if the number of bands is 96, a 7 bit index may be used to identify the strongest energy bands. At step 805, the results of step 804 are output. For example, results of step 804 include generated audio signatures, detected features, associated data, and alternative signatures for interfering sound cancellation.

As described herein, methods are provided to improve search accuracy using measures of uniqueness and information content in every audio fingerprint and its individual fields. The signatures that have more unique information are preferred over others with lower information.

Those of skill in the art will appreciate that based on the present disclosure additional alternative systems and methods for robust audio identification with interference cancellation may be determined in accordance with the disclosed principles of the present invention. Thus, while particular embodiments and applications of the present invention have been illustrated and described, it is to be understood that the invention is not limited to the precise construction and components disclosed herein and that various modifications, changes and variations which will be apparent to those of ordinary skill in the art may be made in the arrangement, operation and details of the method and apparatus of the present invention disclosed herein without departing from the spirit and scope of the invention as defined in the appended claims.

The invention claimed is:

1. A method of audio speech recognition, comprising:
  receiving an audio signal;
  generating a spectrogram of the audio signal and a plurality of transform coefficients;
  processing, using at least one of a hidden Markov model (HMM) or a pattern matching model, the plurality of transform coefficients to detect at least one of a first plurality of speech phonemes or human speech;
  determining, based on the at least one of the first plurality of speech phonemes or human speech, one or more components of the spectrogram and one or more of the plurality of transform coefficients associated with likely interfering speech from an interference source;
  subtracting, from the spectrogram, the one or more components associated with the likely interfering speech to form a clean audio signal; and processing, using the at least one of the HMM or the pattern matching model, the clean audio signal to detect a second plurality of speech phonemes.

2. The method of claim 1, wherein processing the clean audio signal comprises computing the HMM on the clean audio signal to detect the second plurality of speech phonemes.

3. The method of claim 2, further comprising performing, using the HMM, speech recognition on the second plurality of speech phonemes.

4. The method of claim 1, wherein processing the clean audio signal comprises computing a state based model on the clean audio signal to detect the second plurality of speech phonemes.

5. The method of claim 1, wherein processing the clean audio signal comprises computing the pattern matching model on the clean audio signal to detect the second plurality of speech phonemes.

6. The method of claim 1, wherein the spectrogram and the plurality of transform coefficients include a fundamental frequency and a plurality of formants.

7. The method of claim 1, further comprising synthesizing the likely interfering speech from the spectrogram and the plurality of transform coefficients of the interference source.

8. The method of claim 1, further comprising:
identifying, from the audio signal and using a plurality of microphones, a plurality of audio sources; and
separating the plurality of audio sources from audio signal.

9. The method of claim 1, further comprising segmenting the audio signal into a plurality of separate sources for (i) speech and (ii) music.

10. A non-transitory machine-readable medium having instructions embodied thereon, which, when executed by one or more processors of a machine, cause the machine to perform operations comprising:
receiving an audio signal;
generating a spectrogram of the audio signal;
processing, using at least one of a hidden Markov model (HMM) or a pattern matching model, the plurality of transform coefficients to detect at least one of a first plurality of speech phonemes or human speech;
determining, based on the at least one of the first plurality of speech phonemes or human speech, one or more components of the spectrogram and one or more of the plurality of transform coefficients associated with likely interfering speech from an interference source;
subtracting, from the spectrogram, the one or more components associated with the likely interfering speech to form a clean audio signal; and
processing, using the at least one of the HMM or the pattern matching model, the clean audio signal to detect a second plurality of speech phonemes.

11. The non-transitory machine-readable medium of claim 10, wherein processing the clean audio signal comprises computing the HMM on the clean audio signal to detect the second plurality of speech phonemes.

12. The non-transitory machine-readable medium of claim 11, further comprising performing, using the HMM, speech recognition on the second plurality of speech phonemes.

13. The non-transitory machine-readable medium of claim 10, wherein processing the clean audio signal comprises computing a state based model on the clean audio signal to detect the second plurality of speech phonemes.

14. The non-transitory machine-readable medium of claim 10, wherein processing the clean audio signal comprises computing the pattern matching model on the clean audio signal to detect the second plurality of speech phonemes.

15. The non-transitory machine-readable medium of claim 10, wherein the spectrogram and the plurality of transform coefficients include a fundamental frequency and a plurality of formants.

16. The non-transitory machine-readable medium of claim 10, further comprising synthesizing the likely interfering speech from the spectrogram and the plurality of transform coefficients of the interference source.

17. The non-transitory machine-readable medium of claim 10, further comprising:
identifying, from the audio signal and using a plurality of microphones, a plurality of audio sources; and
separating the plurality of audio sources from audio signal.

18. A speech recognition system, comprising:
a receiver configured to receive an audio signal;
a memory that stores instructions; and
one or more processors configured by the instructions to perform operations comprising:
generating a spectrogram of the audio signal;
processing, using at least one of a hidden Markov model (HMM) or a pattern matching model, the plurality of transform coefficients to detect at least one of a first plurality of speech phonemes or human speech;
determining, based on the at least one of the first plurality of speech phonemes or human speech, one or more components of the spectrogram and one or more of the plurality of transform coefficients associated with likely interfering speech from an interference source;
subtracting, from the spectrogram, the one or more components associated with the likely interfering speech to form a clean audio signal; and
processing, using the at least one of the HMM or the pattern matching model, the clean audio signal to detect a second plurality of speech phonemes.

19. The speech recognition system of claim 18, wherein processing the clean audio signal comprises computing the HMM on the clean audio signal to detect the second plurality of speech phonemes.

20. The speech recognition system of claim 18, wherein processing the clean audio signal comprises computing the pattern matching model on the clean audio signal to detect the second plurality of speech phonemes.

* * * * *